(12) United States Patent
Tallamraju et al.

(10) Patent No.: US 10,866,932 B2
(45) Date of Patent: Dec. 15, 2020

(54) OPERATION MAPPING IN A VIRTUAL FILE SYSTEM FOR CLOUD-BASED SHARED CONTENT

(71) Applicant: Box, Inc., Redwood City, CA (US)

(72) Inventors: Sri Sarat Ravikumar Tallamraju, Carmichael, CA (US); Tanooj Luthra, San Diego, CA (US); Ritik Malhotra, San Jose, CA (US)

(73) Assignee: Box, Inc., Redwood City, CA (US)

( * ) Notice: Subject to any disclaimer, the term of this patent is extended or adjusted under 35 U.S.C. 154(b) by 317 days.

(21) Appl. No.: 16/036,735

(22) Filed: Jul. 16, 2018

(65) Prior Publication Data
US 2019/0042593 A1   Feb. 7, 2019

Related U.S. Application Data

(63) Continuation of application No. 15/140,248, filed on Apr. 27, 2016, now Pat. No. 10,025,796.
(Continued)

(51) Int. Cl.
G06F 16/182 (2019.01)
G06F 9/46 (2006.01)
(Continued)

(52) U.S. Cl.
CPC .............. *G06F 16/182* (2019.01); *G06F 9/46* (2013.01); *G06F 12/0891* (2013.01);
(Continued)

(58) Field of Classification Search
CPC ...... G06F 16/182; G06F 16/172; G06F 16/23; G06F 16/183; G06F 16/185;
(Continued)

(56) References Cited

U.S. PATENT DOCUMENTS 6,512,529 B1   1/2003   Janssen
6,750,858 B1   6/2004   Rosenstein
(Continued)

OTHER PUBLICATIONS

Juve, Gideon, et al., "Automating Application Deployment in Infrastructure Clouds", CloudCom 2011, Athens, Greece, Nov. 29-Dec. 1, 2011, pp. 658-665.*
(Continued)

*Primary Examiner* — Robert Stevens
(74) *Attorney, Agent, or Firm* — Vista IP Law Group, LLP

(57) ABSTRACT

A server in a cloud-based environment is interfaced with storage devices that store shared content accessible by two or more user devices that interact with the cloud-based service platform over a network. A virtual file system module is delivered to a user device, which user device hosts one or more applications. The virtual file system module detects a plurality of application calls issued by processes or threads operating on the user device. The plurality of application calls are mapped into one coalesced cloud call. The coalesced cloud call is delivered to the cloud-based service platform to facilitate access to the shared content by the application. The mapping of application calls to the coalesced cloud call is based on pattern rules that are applied over a stream of incoming application calls. A delay may be observed after mapping to a first pattern, and before making a mapping to a second pattern.

21 Claims, 22 Drawing Sheets

Related U.S. Application Data

(60) Provisional application No. 62/154,658, filed on Apr. 29, 2015.

(51) Int. Cl.

| | | |
|---|---|---|
| *G06F 16/23* | (2019.01) | |
| *G06F 16/172* | (2019.01) | |
| *G06F 16/185* | (2019.01) | |
| *G06F 16/188* | (2019.01) | |
| *G06F 16/17* | (2019.01) | |
| *G06F 16/174* | (2019.01) | |
| *G06F 16/176* | (2019.01) | |
| *G06F 16/957* | (2019.01) | |
| *H04L 29/08* | (2006.01) | |
| *G06F 12/1081* | (2016.01) | |
| *H04L 29/06* | (2006.01) | |
| *G06F 12/0891* | (2016.01) | |
| *G06F 12/122* | (2016.01) | |
| *H04N 19/40* | (2014.01) | |
| *G06F 16/242* | (2019.01) | |
| *G06F 16/22* | (2019.01) | |
| *G06F 16/11* | (2019.01) | |

(52) U.S. Cl.
CPC ........ *G06F 12/1081* (2013.01); *G06F 12/122* (2013.01); *G06F 16/113* (2019.01); *G06F 16/172* (2019.01); *G06F 16/1727* (2019.01); *G06F 16/1748* (2019.01); *G06F 16/1774* (2019.01); *G06F 16/183* (2019.01); *G06F 16/185* (2019.01); *G06F 16/188* (2019.01); *G06F 16/196* (2019.01); *G06F 16/22* (2019.01); *G06F 16/23* (2019.01); *G06F 16/2443* (2019.01); *G06F 16/9574* (2019.01); *H04L 63/0428* (2013.01); *H04L 65/602* (2013.01); *H04L 65/607* (2013.01); *H04L 65/80* (2013.01); *H04L 67/06* (2013.01); *H04L 67/1097* (2013.01); *H04L 67/34* (2013.01); *H04N 19/40* (2014.11); *G06F 2212/1016* (2013.01); *G06F 2212/1044* (2013.01); *G06F 2212/154* (2013.01); *G06F 2212/463* (2013.01); *G06F 2212/60* (2013.01); *G06F 2212/657* (2013.01)

(58) Field of Classification Search
CPC ............... G06F 16/188; G06F 16/1727; G06F 16/1748; G06F 16/1774; G06F 16/9574; G06F 16/2443; G06F 16/22; G06F 16/196; G06F 16/113; G06F 9/46; G06F 12/1081; G06F 12/0891; G06F 12/122; G06F 2212/1016; G06F 2212/463; G06F 2212/657; G06F 2212/1044; G06F 2212/154; H04L 65/602; H04L 65/607; H04L 65/80; H04L 67/06; H04L 67/1097; H04L 67/34; H04L 63/0428; H04N 19/40
USPC ........................................................ 707/743
See application file for complete search history.

(56) References Cited

U.S. PATENT DOCUMENTS

| | | | |
|---|---|---|---|
| 7,047,309 B2 | 5/2006 | Baumann | |
| 7,281,168 B1 * | 10/2007 | Coates | G06F 11/2056 714/1 |
| 7,404,000 B2 * | 7/2008 | Lolayekar | H04L 69/08 709/230 |
| 7,694,065 B2 | 4/2010 | Petev | |
| 7,975,018 B2 | 7/2011 | Unrau | |
| 8,180,801 B2 | 5/2012 | Zhang | |
| 8,423,606 B1 | 4/2013 | Streeter | |
| 8,489,549 B2 | 7/2013 | Guarraci | |
| 8,527,549 B2 | 9/2013 | Cidon | |
| 8,548,957 B2 * | 10/2013 | Guarraci | G06F 16/188 707/675 |
| 8,634,456 B2 | 1/2014 | Chen | |
| 8,826,332 B2 | 9/2014 | Marshall | |
| 8,849,761 B2 | 9/2014 | Prahlad | |
| 8,886,704 B2 | 11/2014 | Busey | |
| 8,886,894 B2 | 11/2014 | Adi-Tabatabai | |
| 8,948,258 B2 | 2/2015 | Chen | |
| 8,954,596 B2 | 2/2015 | Ronca | |
| 9,015,470 B2 | 4/2015 | Losev | |
| 9,087,066 B2 * | 7/2015 | Acharya | G06F 16/164 |
| 9,191,725 B2 | 11/2015 | Schmidt | |
| 9,210,085 B2 | 12/2015 | Harrison | |
| 9,253,166 B2 | 2/2016 | Gauda | |
| 9,288,510 B1 | 3/2016 | Yang | |
| 9,294,530 B2 | 3/2016 | McCormick | |
| 9,307,258 B2 | 4/2016 | Macinnis | |
| 9,313,510 B2 | 4/2016 | Shivadas | |
| 9,319,678 B2 | 4/2016 | Coudurier | |
| 9,332,050 B2 | 5/2016 | Collard | |
| 9,384,209 B2 | 7/2016 | Kim | |
| 9,392,304 B2 | 7/2016 | Coudurier | |
| 9,432,704 B2 | 8/2016 | Mutton | |
| 9,444,695 B2 | 9/2016 | Dutta | |
| 9,501,212 B2 | 11/2016 | Marshall | |
| 9,544,348 B2 | 1/2017 | Devereaux | |
| 9,621,613 B1 | 4/2017 | Huang | |
| 9,628,268 B2 | 4/2017 | Kiang et al. | |
| 9,632,814 B2 * | 4/2017 | Bonilla | G06F 3/067 |
| 9,715,428 B1 | 7/2017 | Morshed | |
| 9,756,022 B2 | 9/2017 | Amiri et al. | |
| 9,788,015 B2 | 10/2017 | Chen | |
| 9,811,532 B2 | 11/2017 | Parkison et al. | |
| 9,852,361 B1 | 12/2017 | Prasad | |
| 9,900,608 B2 | 2/2018 | Coudurier | |
| 9,930,365 B2 | 3/2018 | Chen | |
| 9,940,241 B1 | 4/2018 | Mehrotra | |
| 9,973,564 B2 | 5/2018 | Dong | |
| 10,033,787 B2 | 7/2018 | Ronca | |
| 10,063,872 B2 | 8/2018 | Coward | |
| 2004/0100937 A1 | 5/2004 | Chen | |
| 2004/0107319 A1 | 6/2004 | D'Orto | |
| 2006/0059509 A1 | 3/2006 | Huang | |
| 2007/0076626 A1 | 4/2007 | Wise | |
| 2008/0098237 A1 | 4/2008 | Dung | |
| 2009/0016445 A1 | 1/2009 | Gao | |
| 2009/0310669 A1 | 12/2009 | Konoshima | |
| 2010/0070608 A1 | 3/2010 | Hosur | |
| 2010/0211690 A1 | 8/2010 | Pakzad | |
| 2010/0250867 A1 | 9/2010 | Bettger | |
| 2010/0268840 A1 | 10/2010 | Hiie | |
| 2010/0332479 A1 | 12/2010 | Prahlad | |
| 2011/0066668 A1 | 3/2011 | Guarraci | |
| 2011/0096828 A1 | 4/2011 | Chen | |
| 2011/0179167 A1 | 7/2011 | Tanimoto | |
| 2011/0185292 A1 * | 7/2011 | Chawla | G06F 9/452 715/760 |
| 2011/0194613 A1 | 8/2011 | Chen | |
| 2011/0231519 A1 | 9/2011 | Luby | |
| 2011/0231569 A1 | 9/2011 | Luby | |
| 2011/0238789 A1 | 9/2011 | Luby | |
| 2011/0239078 A1 | 9/2011 | Luby | |
| 2011/0246616 A1 | 10/2011 | Ronca | |
| 2011/0305273 A1 | 12/2011 | He | |
| 2011/0320733 A1 | 12/2011 | Sanford | |
| 2012/0016838 A1 | 1/2012 | Arai | |
| 2012/0023249 A1 | 1/2012 | Chen | |
| 2012/0158802 A1 | 6/2012 | Lakshmanan | |
| 2012/0278497 A1 | 11/2012 | Hsu | |
| 2012/0331089 A1 | 12/2012 | Vonog | |
| 2013/0013803 A1 | 1/2013 | Bichot | |
| 2013/0110961 A1 | 5/2013 | Jadhav | |
| 2013/0117418 A1 | 5/2013 | Mutton | |
| 2013/0138810 A1 | 5/2013 | Binyamin | |
| 2013/0223509 A1 | 8/2013 | Tweedale | |

(56) References Cited

U.S. PATENT DOCUMENTS

| | | |
|---|---|---|
| 2013/0238785 A1 | 9/2013 | Hawk |
| 2013/0276048 A1 | 10/2013 | Krasic |
| 2013/0318198 A1 | 11/2013 | Zuk |
| 2013/0339470 A1 | 12/2013 | Jeswani |
| 2014/0006354 A1 | 1/2014 | Parkison et al. |
| 2014/0006465 A1 | 1/2014 | Davis |
| 2014/0108792 A1 | 4/2014 | Borzycki |
| 2014/0118379 A1 | 5/2014 | Hakura |
| 2014/0119457 A1 | 5/2014 | Macinnis |
| 2014/0140417 A1 | 5/2014 | Shaffer |
| 2014/0149591 A1* | 5/2014 | Bhattacharya ........ G06F 9/5072 709/226 |
| 2014/0149783 A1 | 5/2014 | Georgiev |
| 2014/0153909 A1 | 6/2014 | Macinnis |
| 2014/0177733 A1 | 6/2014 | Coudurier |
| 2014/0181864 A1 | 6/2014 | Marshall |
| 2014/0201141 A1 | 7/2014 | Vibhor et al. |
| 2014/0269932 A1 | 9/2014 | Su |
| 2014/0281009 A1 | 9/2014 | Moorthy |
| 2014/0282771 A1 | 9/2014 | Tumuluru |
| 2014/0324929 A1 | 10/2014 | Mason, Jr. |
| 2014/0351455 A1 | 11/2014 | McCormick |
| 2014/0359465 A1 | 12/2014 | Litan Sever |
| 2014/0379647 A1* | 12/2014 | Smith ................... G06F 16/178 707/624 |
| 2014/0380376 A1 | 12/2014 | Schmidt |
| 2015/0039726 A1 | 2/2015 | Hoffert |
| 2015/0067109 A1 | 3/2015 | Tang |
| 2015/0067753 A1 | 3/2015 | Shemesh |
| 2015/0098690 A1 | 4/2015 | Abbate |
| 2015/0220561 A1* | 8/2015 | Goetz ................... G06F 16/178 707/827 |
| 2015/0227602 A1 | 8/2015 | Ramu |
| 2015/0242436 A1* | 8/2015 | Bodin ..................... G06F 9/445 707/827 |
| 2015/0372939 A1 | 12/2015 | Redler, IV |
| 2016/0014095 A1 | 1/2016 | Strayer |
| 2016/0065364 A1 | 3/2016 | Amiri et al. |
| 2016/0103851 A1 | 4/2016 | Dimitrov |
| 2016/0119657 A1 | 4/2016 | Sun |
| 2016/0323351 A1 | 4/2016 | Lurhra et al. |
| 2016/0156948 A1 | 6/2016 | Yang |
| 2016/0173900 A1 | 6/2016 | Lee |
| 2016/0212440 A1 | 7/2016 | Coudurier |
| 2016/0234282 A1 | 8/2016 | Lederer |
| 2016/0241898 A1 | 8/2016 | Korz |
| 2016/0321287 A1 | 11/2016 | Luthra et al. |
| 2016/0321288 A1 | 11/2016 | Malhotra et al. |
| 2016/0321291 A1 | 11/2016 | Malhotra et al. |
| 2016/0321311 A1 | 11/2016 | Tallamraju et al. |
| 2016/0323358 A1 | 11/2016 | Malhotra et al. |
| 2017/0134344 A1 | 5/2017 | Wu |
| 2017/0141921 A1 | 5/2017 | Berger |
| 2018/0098083 A1 | 4/2018 | McAllister |

OTHER PUBLICATIONS

"Data deduplication", Wikipedia, URL: https://en.wikipedia.org/wiki/Data_deduplication, Mar. 6, 2016, Accessed on Apr. 10, 2016, 7 pages.

"REST Docs | Bitcasa Developer Center", URL: https://developer.bitcasa.com/docs/rest/, Sep. 2015, Accessed on Jan. 15, 2016, 188 pages.

Apache Thrift Wikipedia, URL: https://en.wikipedia.org/wiki/Apache_Thrift, Oct. 27, 2015, Accessed on Jan. 26, 2016, 5 pages.

Chiu, David, et al., "Elastic Cloud Caches for Accelerating Service-Oriented Computations", SC '10, New Orleans, LA, Nov. 13-19, 2010, 11 pages.

Chun, Byung-Gon, et al., "CloneCloud: Elastic Execution between Mobile Device and Cloud", EuroSys '11, Salzburg, Austria, Apr. 10-13, 2011, pp. 301-314.

Final Office Action dated Feb. 6, 2019 for U.S. Appl. No. 15/140,357, 23 pages.

Final Office Action dated Mar. 20, 2020 for U.S. Appl. No. 15/140,292, 20 pages.

Final Office Action dated Jun. 30, 2020 for U.S. Appl. No. 15/140,357, 33 pages.

Final Office Action dated Aug. 1, 2018 for U.S. Appl. No. 15/140,292, 25 pages.

Final Office Action dated Oct. 30, 2018 for U.S. Appl. No. 15/140,270, 22 pages.

Haining, Theodore R., et al., "Management Policies for Non-Volatile Write Caches", PCCC 1999, Scottsdale, AZ, Feb. 12, 1999, pp. 321-328.

Kim, Hwanju, et al., "XHive: Efficient Cooperative Caching for Virtual Machines", IEEE Transactions on Computers, vol. 60, No. 1, Jan. 2011, pp. 106-119.

Kim, Hyeon Gyu, et al., "Time-slide window join over data streams", Journal of Intelligent Information Streams, vol. 43, Issue 2, Oct. 2014, pp. 323-347.

Li, Jin, et al., "AdaptWID: An Adaptive, Memory-Efficient Window Aggregation Implementation", IEEE Internet Computing, vol. 12, Issue 6, Nov.-Dec. 2008, pp. 22-29.

Li, Jin, et al., "Semantics and Evaluation Techniques for Window Aggregates in Data Streams", ACM SIGMOD 2005, Baltimore, MD, Jun. 14-16, 2005, pp. 311-322.

Mancuso, Renato, et al., "Real-Time Cache Management Framework for Multi-core Architectures", RTAS 2013, Philadelphia, PA, Apr. 9-11, 2013, pp. 45-54.

Mao, Huajian, et al., "Wukong: A cloud-oriented file service for mobile Internet devices", Journal of Parallel and Distributed Computing, vol. 72, Issue 2, Feb. 2012, pp. 171-184.

Maxim Levkov. "Understanding the MPEG-4 Movie Atom", Adobe Developer Connection, 5 pages. (Year: 2010).

Non-Final Office Action dated Feb. 5, 2020 for U.S. Appl. No. 15/140,357, 23 pages.

Non-Final Office Action dated Feb. 23, 2018 for U.S. Appl. No. 15/140,292, 12 pages.

Non-Final Office Action dated Apr. 18, 2018 for U.S. Appl. No. 15/140,310, 8 pages.

Non-Final Office Action dated May 14, 2018 for U.S. Appl. No. 15/140,270, 14 pages.

Non-Final Office Action dated Jun. 3, 2019 for U.S. Appl. No. 15/140,357, 20 pages.

Non-Final Office Action dated Jun. 13, 2019 for U.S. Appl. No. 15/140,292, 23 pages.

Non-Final Office Action dated Nov. 9, 2018 for U.S. Appl. No. 15/140,357, 24 pages.

Notice of Allowance dated Feb. 21, 2018 for U.S. Appl. No. 15/140,330, 19 pages.

Notice of Allowance dated Mar. 14, 2018 for U.S. Appl. No. 15/140,248, 10 pages.

Notice of Allowance dated Apr. 5, 2019 for U.S. Appl. No. 15/140,270, 12 pages.

Notice of Allowance dated Apr. 5, 2019 for U.S. Appl. No. 16/024,748, 29 pages.

Notice of Allowance dated Jun. 15, 2018 for U.S. Appl. No. 15/140,179, 23 pages.

Notice of Allowance dated Jun. 30, 2020 for U.S. Appl. No. 16/174,202, 6 pages.

Notice of Allowance dated Sep. 6, 2018 for U.S. Appl. No. 15/140,310, 13 pages.

Patroumpas, Kostas, et al., "Maintaining consistent results of continuous queries under diverse window specifications", Information Systems, vol. 36, Issue 1, Mar. 2011, pp. 42-61.

Patroumpas, Kostas, et al., "Window Specification over Data Streams", EDBT 2006 Workshops, LNCS 4254, © IFIP International Federation for Information Processing© 2006, pp. 445-464.

Peng, Chunyi, et al., "VON: Virtual Machine Image Distribution Network for Cloud Data Centers", INFOCOM 2012, Orlando, FL, Mar. 25-30, 2012, pp. 181-189.

Saxena, Mohit, et al., "Flash Tier: A Lightweight, Consistent and Durable Storage Cache", EuroSys '12, Bern, Switzerland, Apr. 10-13, 2012, pp. 267-280.

(56) References Cited

OTHER PUBLICATIONS

Stefanov, Emil, et al., "Iris: A Scalable Cloud File System with Efficient Integrity Checks", ACSAC '12, Orlando, FL, Dec. 3-7, 2012, pp. 229-238.
Wang, Haiyang, et al., "On the Impact of Virtualization on Dropbox-like Cloud File Storage/Synchronization Services", IWQoS'12, Coimbra, Portugal, Jun. 4-5, 2012, Article No. 11, 9 pages.
Zhou, Yuanyuan, et al., "Second-Level Buffer Cache Management", IEEE Transactions on Parallel and Distributed Systems, vol. 15, No. 6, Jun. 2004, pp. 505-519.
Notice of Allowance dated Oct. 21, 2020 for U.S. Appl. No. 16/174,202 9 pages.
Final Office Action dated Oct. 9, 2020 for U.S. Appl. No. 15/140,357 27 pages.
Notice of Allowance dated Oct. 21, 2020 for U.S. Appl. No. 15/140,292 21 pages.

* cited by examiner

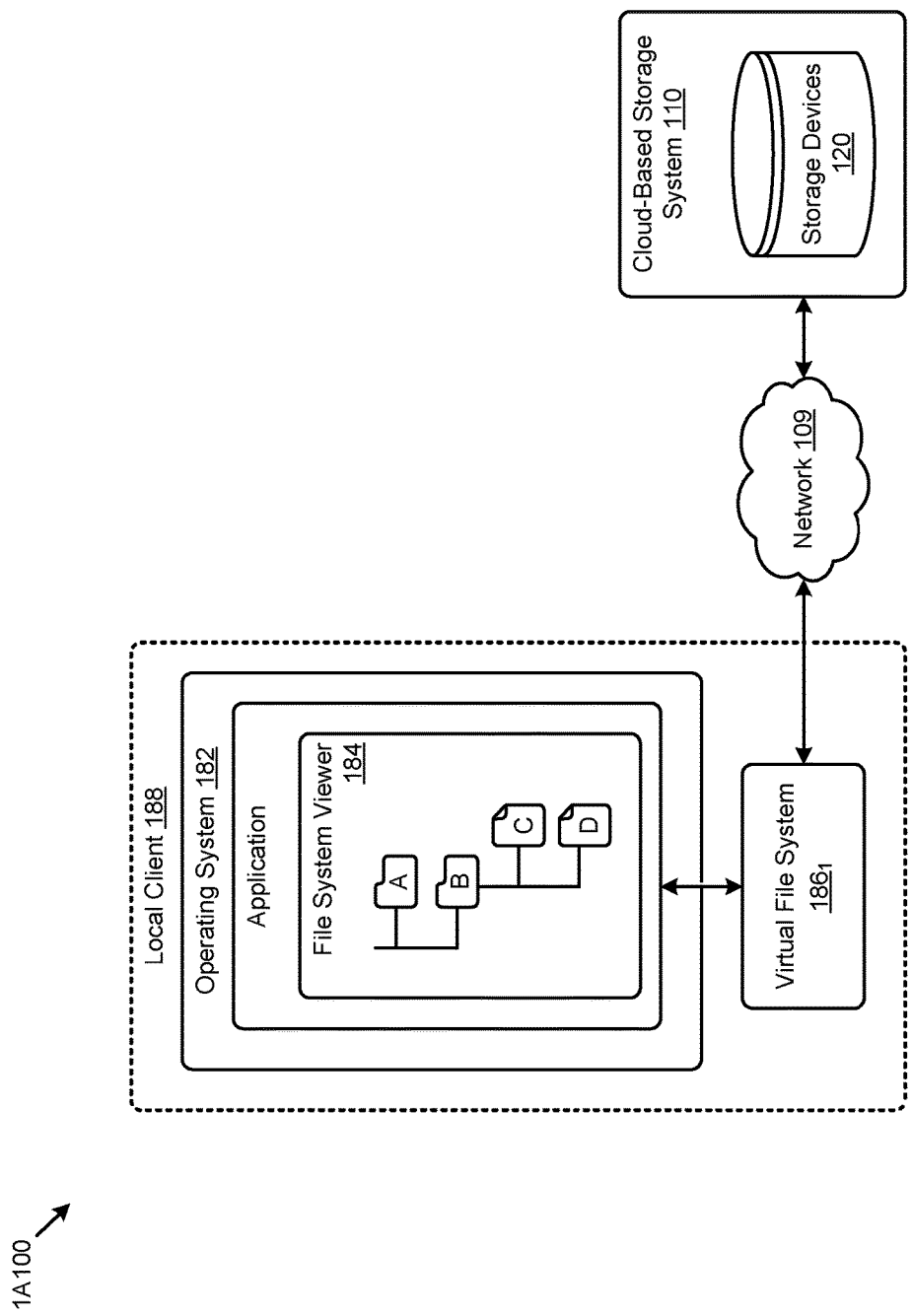
FIG. 1A1

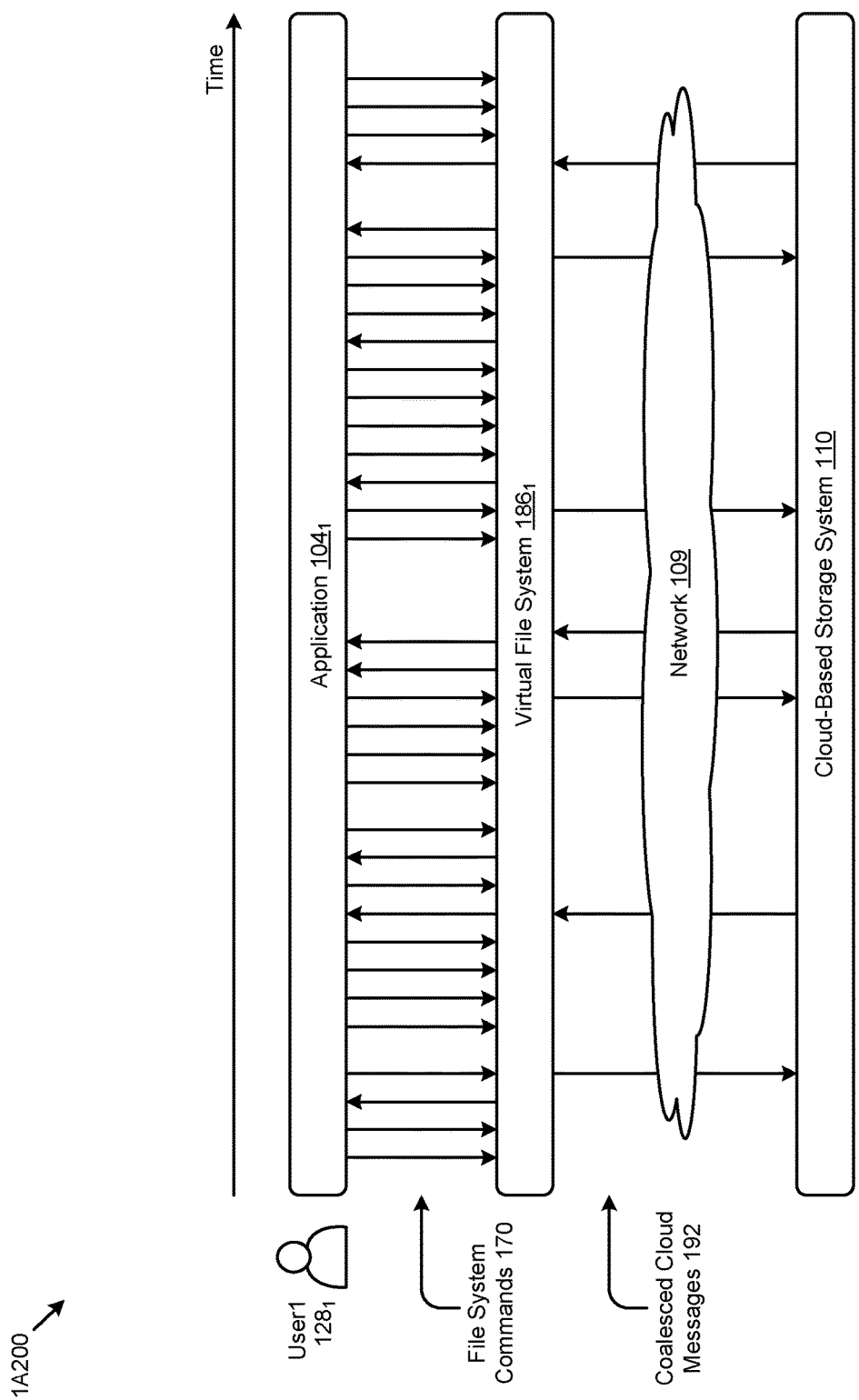
FIG. 1A2

Application-Specific Function Attributes 424

| Process ID | Name | Platform | File Attribute(s) | Response |
|---|---|---|---|---|
| 1204 | readFile() | Any | file_extension=".boxnote" | Open in browser |
| 9834 | readFile() | Any | file_permission="blocked" | Return error 550 |
| 8388 | quickLookD | MacOS | file_local="0" | Ignore |
| 2426 | quickLookD | MacOS | file_local="1" | Execute |
| 9812 | SearchProtocolHost.exe | Windows | n/a | Return error 550 |
| ... | | | | |

Application-Specific Rules 404

FIG. 4B

| Pattern ID | Operation Description | Operation Pattern | Cloud Call |
|---|---|---|---|
| 23 | Delete Folder | delete[X/Cn] for all n;delete[/X] | delFolder[/X] |
| 11 | Rich Text Editor Save1 | create[Y];rename[X→Z];rename[Y→X];delete[Z] | newVersion[X] |
| 02 | Rich Text Editor Save2 | rename[X→Z];create[Y];rename[Y→X];delete[Z] | newVersion[X] |
| 14 | Code Editor Save | create[Y];rename[Y→X] | newVersion[X] |
| 05 | Create New Document | create[X];edit[X] | create[X] |

Pattern Attributes 524

Pattern Rules 504

FIG. 5B

OPERATION MAPPING IN A VIRTUAL FILE SYSTEM FOR CLOUD-BASED SHARED CONTENT

CROSS-REFERENCE TO RELATED APPLICATION(S)

The present application is a continuation of U.S. patent application Ser. No. 15/140,248 filed on Apr. 27, 2016, issued on Jul. 17, 2018 as U.S. Pat. No. 10,025,796, which claims the benefit of priority to U.S. Provisional Application No. 62/154,658 filed on Apr. 29, 2015, which are hereby incorporated by reference in their entirety.

FIELD

This disclosure relates to managing content in a cloud-based service platform and more particularly to techniques for operation mapping in a virtual file system for accessing cloud-based shared content.

BACKGROUND

Cloud-based content management services and platforms have impacted the way personal and corporate electronically stored information objects (e.g., files, images, videos, etc.) are stored, and have also impacted the way such personal and corporate content is shared and managed. One benefit of using such cloud-based platforms is the ability to securely share large volumes of content among trusted collaborators on a variety of user devices such as mobile phones, tablets, laptop computers, desktop computers, and/or other devices. For example, a large enterprise with thousands of users (e.g., employees) and many terabytes of content might use a cloud-based content storage platform to efficiently and securely facilitate content access to various individual users and/or collaborative groups of users. By accessing such a cloud-based content storage platform, a user can access a large volume of objects from a user device that might store merely a small portion of that volume locally. Such access can enable multiple users (e.g., collaborators) to access certain shared objects for various collaborative purposes (e.g., to perform co-development, to facilitate audience presentation and participation, etc.). Further, such access can be performed from user devices having various operating systems (e.g., Windows, Mac OS, Linux) and/or such access can be performed from within various applications running on the user devices.

Unfortunately, legacy techniques for managing remote cloud-based shared content on a local user device are deficient at least as regarding delivery of needed facilities to efficiently access the content from multiple user device platforms (e.g., operating systems, applications, etc.). Some needed approaches might implement a virtual file system on the user devices of collaborators to facilitate access to the cloud-based shared content. In such cases, the varying characteristics (e.g., syntax, semantics, data structures, error response handling, etc.) of the user device platforms might require maintenance of multiple platform-specific versions of the virtual file system, consuming significant resources (e.g., engineering, computing, storage, etc.).

In other cases, various operations invoked by certain operating systems and/or applications at the user devices can generate multiple calls and/or responses for each operation. While such multiple messages might not negatively impact the user experience when processed locally on the user device, transacting multiple messages with the cloud-based storage system through the virtual file system and network can consume large amounts of network bandwidth and, potentially, the effects of transacting multiple messages can negatively impact the user experience (e.g., slow down rendering of information in the application). Still worse, legacy approaches that implement path-based versioning in a cloud-based storage system can incur incorrect version conclusions in response to certain platform-specific operations. For example, if one collaborator renames "ObjectA" to "ObjectB", and another collaborator renames "ObjectC" to "ObjectA", the local platform-specific calls generated from such operations might incorrectly conclude that "ObjectA" has a new version. Worse, in some legacy scenarios, if a user saves "ObjectA" using, for example, Microsoft Word, the Word application will execute "Create A_tmp", and then execute a "Rename ObjectA to A_tmp2", and then "Write data to A_tmp", and then "Rename A_tmp to ObjectA", and lastly, "Delete A_tmp2". These operations would destroy the version history for ObjectA, which is undesirable behavior. Such issues with legacy approaches can impact collaboration efficiency and/or effectiveness.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for operation mapping in a virtual file system for cloud-based shared content, which techniques advance the relevant technologies to address technological issues with legacy approaches. More specifically, the present disclosure provides a detailed description of techniques used in systems, methods, and in computer program products for operation mapping in a virtual file system for cloud-based shared content. Certain embodiments are directed to technological solutions for implementing a virtual file system (VFS) having a platform-specific interface to a base subsystem that maps platform-specific operations to normalized cloud operations to facilitate efficient access to shared content on a cloud-based storage system, which embodiments advance the relevant technical fields as well as advancing peripheral technical fields.

The disclosed embodiments modify and improve over legacy approaches. In particular, the herein-disclosed techniques provide technical solutions that address the technical problems attendant to multiple collaborators efficiently accessing shared content stored on a cloud-based storage system from multiple local device platforms (e.g., operating systems, applications, etc.). Such technical solutions serve to reduce the demand for computer memory, reduce the demand for network bandwidth, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Further details of aspects, objectives, and advantages of the technological embodiments are described herein and in the following descriptions, drawings and claims.

BRIEF DESCRIPTION OF THE DRAWINGS

The drawings described below are for illustration purposes only. The drawings are not intended to limit the scope of the present disclosure.

FIG. 1A1 illustrates a logical system view of a virtual file system for cloud-based shared content, according to some embodiments.

FIG. 1A2 depicts a cloud communication reduction technique facilitated by operation mapping in a virtual file system for cloud-based shared content, according to some embodiments.

FIG. 2 presents a schematic view of interconnections between system components that cooperate to implement operation mapping in a virtual file system for cloud-based shared content, according to an embodiment.

FIG. 4B depicts a data structure for managing application-specific operations in systems that implement operation mapping in a virtual file system for cloud-based shared content, according to some embodiments.

FIG. 5B presents an operation pattern data structure used for detecting operation patterns to implement operation mapping in a virtual file system for cloud-based shared content, according to some embodiments.

DETAILED DESCRIPTION

Figure 1B:
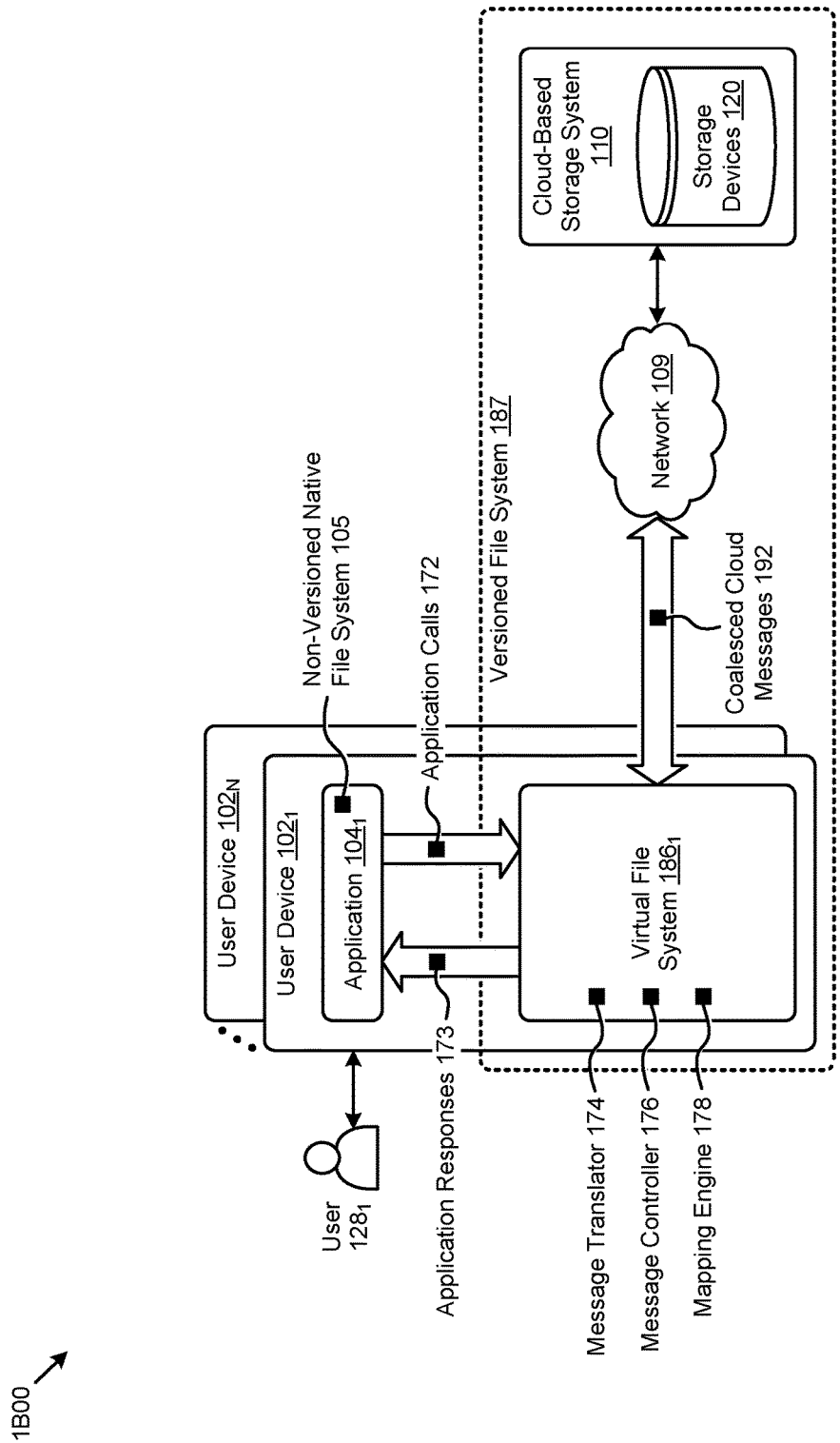
FIG. 1B presents a data flow in systems that implement operation mapping in a virtual file system for cloud-based shared content, according to some embodiments.

Some embodiments of the present disclosure address the problem of multiple collaborators efficiently accessing shared content stored on a cloud-based storage system from multiple local device platforms (e.g., operating systems, applications, etc.), and some embodiments are directed to approaches for implementing a virtual file system (VFS) having a platform-specific interface to a base subsystem that maps platform-specific operations to normalized cloud operations to facilitate efficient access to shared content on a cloud-based storage system. The accompanying figures and discussions herein present example environments, systems, methods, and computer program products for operation mapping in a virtual file system for cloud-based shared content.

Overview

Disclosed herein are techniques that implement a virtual file system (VFS) having a platform-specific interface to a base subsystem that maps platform-specific operations to normalized cloud operations to facilitate efficient access to shared content on a cloud-based storage system. Specifically, in some embodiments, a platform-specific file system interface can translate messages specific to a certain operating system and/or application to messages that can be interpreted by a platform-agnostic subsystem of the virtual file system. In other embodiments, a message controller can manage (e.g., issue, block, delay, etc.) the messages pertaining to certain operations (e.g., based on the message, the application state, and/or other criteria). Further, in certain embodiments, a mapping engine can convert certain sequences (e.g., patterns) of calls to one or more normalized cloud calls to the cloud-based storage system.

A cloud call is a command issued to a cloud-based storage system to direct the a cloud-based storage system to take a particular action based on a set of characteristics of the cloud call. A cloud call can be issued using any known technique for communicating over a network to a cloud-based storage system. In particular a cloud call, together with any parameters, can be delivered to the cloud-based storage system over a packet-switched network such as the Internet.

Use of the aforementioned mapping and/or normalization can facilitate versioning of non-versioned native file systems, reductions in computing resources, and/or other benefits. Other techniques can be implemented to manage error responses (e.g., processing of errors received from the virtual file system) as pertains to error handling in the context of the native operating systems and/or applications in use on the user devices.

Disclosed herein are techniques for:

Operation coalescing between native file system operations and cloud-based systems.

Handling versioning of objects in the presence of a native non-versioned file system.

Handling the aforementioned, including error response handling in a platform-agnostic manner.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A1 illustrates a logical system view 1A100 of a virtual file system for cloud-based shared content. As an option, one or more variations of logical system view 1A100 or any aspect thereof may be implemented in the context of the architecture and functionality of the embodiments described herein. The logical system view 1A100 or any aspect thereof may be implemented in any environment.

As shown, the logical system view 1A100 comprises a local client 188 such as a user device (e.g., smart phone, laptop, etc.) that can have an operating system 182 that includes an application that access a file system. For example, and as shown, the application might include a file system viewer 184 that can render a visual representation of certain objects such as directories (e.g., folder A, folder B, etc.) and/or files (e.g., file C, file D, etc.) accessible at the local client 188. However, some or all of the objects (e.g., directories, files, etc.) accessible and/or visible within the file system viewer 184 might not be managed by the operating system 182. In some cases, the primary storage for such objects might be implemented across a network 109 by a cloud-based storage system 110. For example, certain instances of the cloud-based storage system 110 can be embodied as a cloud-based and/or SaaS-based storage management architecture having one or more instances of storage devices 120. The storage devices 120 can comprise any combination of hardware and/or software that can provide access to the data (e.g., content, objects, etc.) stored on the storage devices 120. For example, the storage devices 120 might be implemented as computer memory operatively managed by an operating system (OS), hard disk drives, solid state drives, networked attached storage, storage area networks, cloud-based storage, and/or any other type of storage facility and/or architecture that is capable of storing data. The data in the storage devices 120 can be implemented as any type of data objects and/or files.

One advantage of the cloud-based storage system 110 serving as the primary storage for certain objects accessible by the local client 188 can be the capability of the cloud-based storage system 110 to facilitate storage functionality as a service on a hosted platform. In such cases, each instance of the local client 188 (e.g., a user device associated with a user) that needs the service does not need to install and configure a respective instance of the cloud-based storage service components on a network (e.g., intranet) comprising the instance of the local client 188. Further, the host environment of the cloud-based storage system 110 can provide storage services to multiple users and/or scale to service any number of users.

According to the herein disclosed techniques, a virtual file system $186_1$ can be delivered to the local client 188 to facilitate access to objects stored at the cloud-based storage system 110. As described herein, the virtual file system $186_1$ can address the problems attendant to multiple users (e.g., collaborators) efficiently accessing shared content stored on the cloud-based storage system 110 from multiple local device platforms (e.g., operating systems, applications, etc.) such as those pertaining to instances of the local client 188. As an example, the virtual file system $186_1$ can enable any native application and/or directory finder and/or explorer at the local client 188 to access various remotely-hosted content objects. Specifically, and as shown in FIG. 1A1, the objects and/or items accessible by a given user at the local client 188 might be presented as a virtual disk (e.g., "VFS:") mounted at the local client 188. Other techniques and/or capabilities can be facilitated by the virtual file system $186_1$. One such capability is described in FIG. 1A2.

Figure 2:
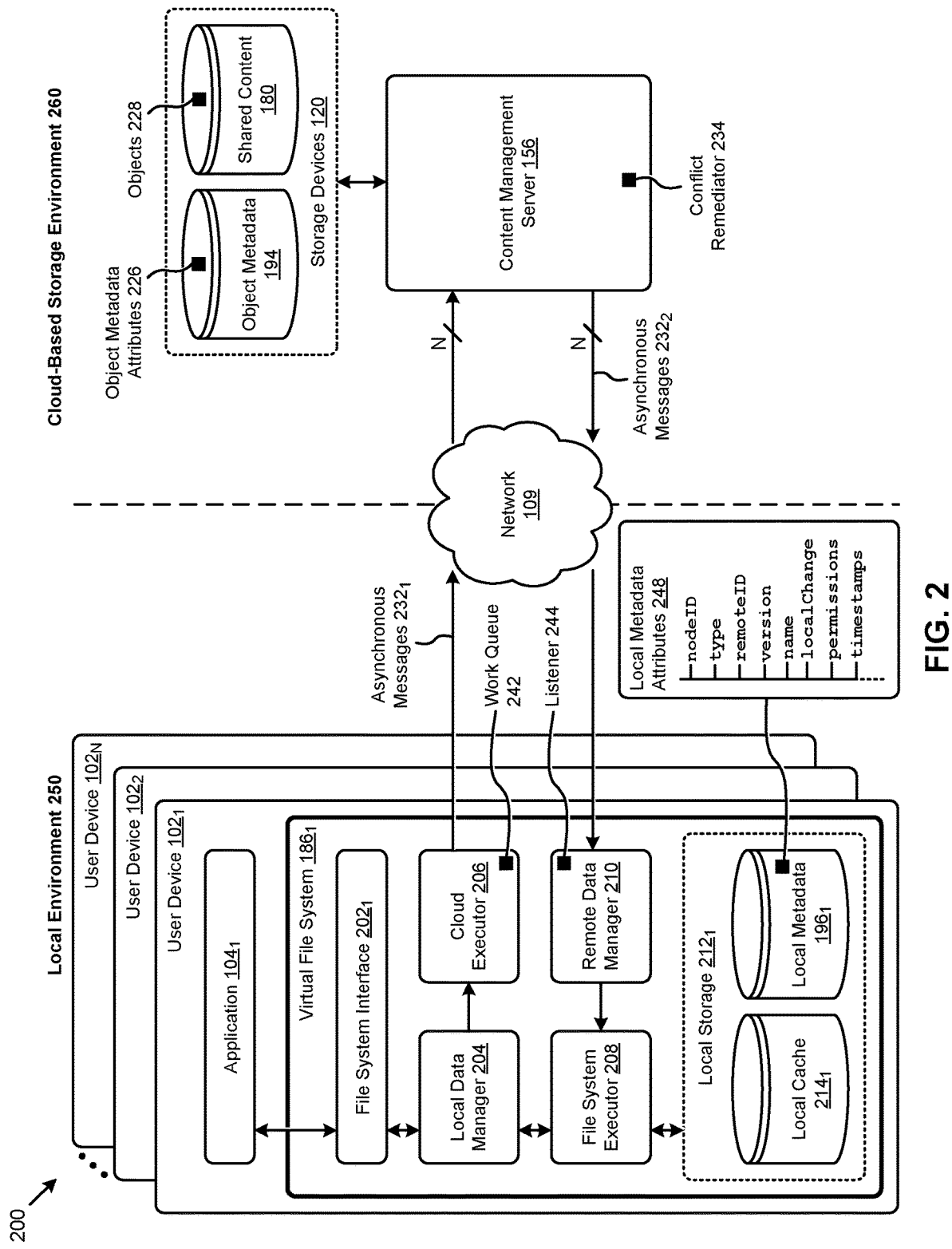

FIG. 1A2 depicts a cloud communication reduction technique 1A200 facilitated by operation mapping in a virtual file system for cloud-based shared content. As an option, one or more variations of cloud communication reduction technique 1A200 or any aspect thereof may be implemented in the context of the architecture and functionality of the embodiments described herein. The cloud communication reduction technique 1A200 or any aspect thereof may be implemented in any environment.

One capability facilitated by the herein disclosed techniques associated with the virtual file system $186_1$ is depicted in FIG. 1A2. Specifically, FIG. 1A2 depicts a user1 $128_1$ interacting with an application $104_1$ (e.g., on a user device) that can interface with the virtual file system $186_1$ to access, via a network 109, shared content on the cloud-based storage system 110. As shown, the application $104_1$ may transact with the virtual file system $186_1$ during the course of executing various operations and/or events associated with the application $104_1$. If such a volume of commands were merely dispatched directly to the cloud-based storage system 110, the resulting operation and/or response latency experienced by the user1 $128_1$ might be detrimental to the efficacy of the application $104_1$ and/or any related collaboration efforts. Further, having multiple users (e.g., many collaborators in an enterprise) issuing such a high volume of file system commands over the network 109 to the cloud-based storage system 110 in a highly collaborative cloud-based environment can consume still further and larger amounts of network bandwidth, computing resources, and/or other resources. The mere presence of so many file system commands increases the likelihood that a conflict might arise.

According to the herein disclosed techniques, and as shown in the cloud communication reduction technique 1A200, the virtual file system $186_1$ can enable the file system commands 170 to be mapped to a set of coalesced cloud messages 192. Specifically, some embodiments implement the virtual file system $186_1$ with a platform-specific interface to a base subsystem that maps platform-specific operations (e.g., producing the file system commands 170 from the application $104_1$) to normalized cloud operations (e.g., comprising the coalesced cloud messages 192) to facilitate efficient access to shared content on the cloud-based storage system 110. Such cloud operations can be called "normalized" since they conform to a common structure that can be interpreted by the cloud-based storage system 110. Further details pertaining to such mapping to normalized and/or coalesced messages are described in FIG. 1B.

FIG. 1B presents a data flow 1B00 in systems that implement operation mapping in a virtual file system for cloud-based shared content. As an option, one or more variations of data flow 1B00 or any aspect thereof may be implemented in the context of the architecture and functionality of the embodiments described herein. The data flow 1B00 or any aspect thereof may be implemented in any environment.

The data flow 1B00 shown in FIG. 1B depicts certain aspects of the herein disclosed techniques that can address several technical challenges attendant to multiple collaborators efficiently accessing shared content stored on a cloud-based storage system from multiple local device platforms (e.g., operating systems, applications, etc.). Specifically, and as shown, instances of a virtual file system (e.g., virtual file system $186_1$, etc.) can be delivered to one or more user devices (e.g., user device $102_1$, . . . , user device $102_N$) associated with various users (e.g., user1 $128_1$, etc.) to enable applications (e.g., application $104_1$, etc.) on the user devices to access shared content stored in the storage devices 120 of the cloud-based storage system 110. For example, application $104_1$ can interface with the virtual file system $186_1$ to access and/or manage (e.g., edit, etc.) one or more content objects in the storage devices 120. According to the herein disclosed techniques, the foregoing access to the cloud-based storage system 110 through the virtual file system $186_1$ can be from various user device platforms and/or applications. For example, the user device $102_1$ can interact with the virtual file system $186_1$ from a variety of operating systems (e.g., Windows, Mac OS, Linux, etc.). The applications represented by the application $104_1$ can further vary. For example, the application $104_1$ might represent Microsoft (MS) Word, Apple (Mac) Finder, Adobe Photoshop, or other applications.

The broad range of user device platforms can be accommodated, in part, by a message translator 174 in the virtual file system $186_1$. For example, the message translator 174 can translate application-specific and/or OS-specific instances of application calls 172 from the application $104_1$ for interpretation by a platform-agnostic subsystem of the virtual file system $186_1$. The message translator 174 can further translate responses (e.g., error messages) from the virtual file system $186_1$ to application-specific and/or OS-specific instances of application responses 173. A message controller 176 can further interpret the application calls 172 to determine which, if any, of the instances of the application calls 172 might be filtered (e.g., blocked, delayed, etc.). For example, certain instances of the application calls 172 might be blocked based on permissions, the state of the application $104_1$, and/or other rules and/or criteria.

A mapping engine 178 at the virtual file system $186_1$ can further map certain sequences of application calls 172 to a set of coalesced cloud messages 192. For example, multiple calls to the virtual file system $186_1$ for a given application operation (e.g., "Save") can be reduced (e.g., coalesced) into a smaller set (e.g., one) of coalesced cloud messages 192. Such mapping serves to reduce the resource usage and/or latencies associated with accessing the cloud-based storage system 110 from the virtual file system $186_1$ through the network 109.

The message management facilitated by the herein disclosed techniques can provide other benefits. Specifically, the capabilities described herein delivered by the virtual file system $186_1$ can provide a versioned file system 187 to a non-versioned native file system 105. For example, the native file system associated with the user device $102_1$ and/or the application $104_1$ might not provide versioning of objects (e.g., files), but such objects managed through the virtual file system $186_1$ as described herein can be tracked by version. Such versioning in a non-versioned environment and/or other capabilities of the herein disclosed techniques can be applied to multiple collaborators operating local user devices to access shared content in a cloud-based storage system. One embodiment of such a cloud-based storage system is described as pertains to FIG. 1C.

Figure 1C:
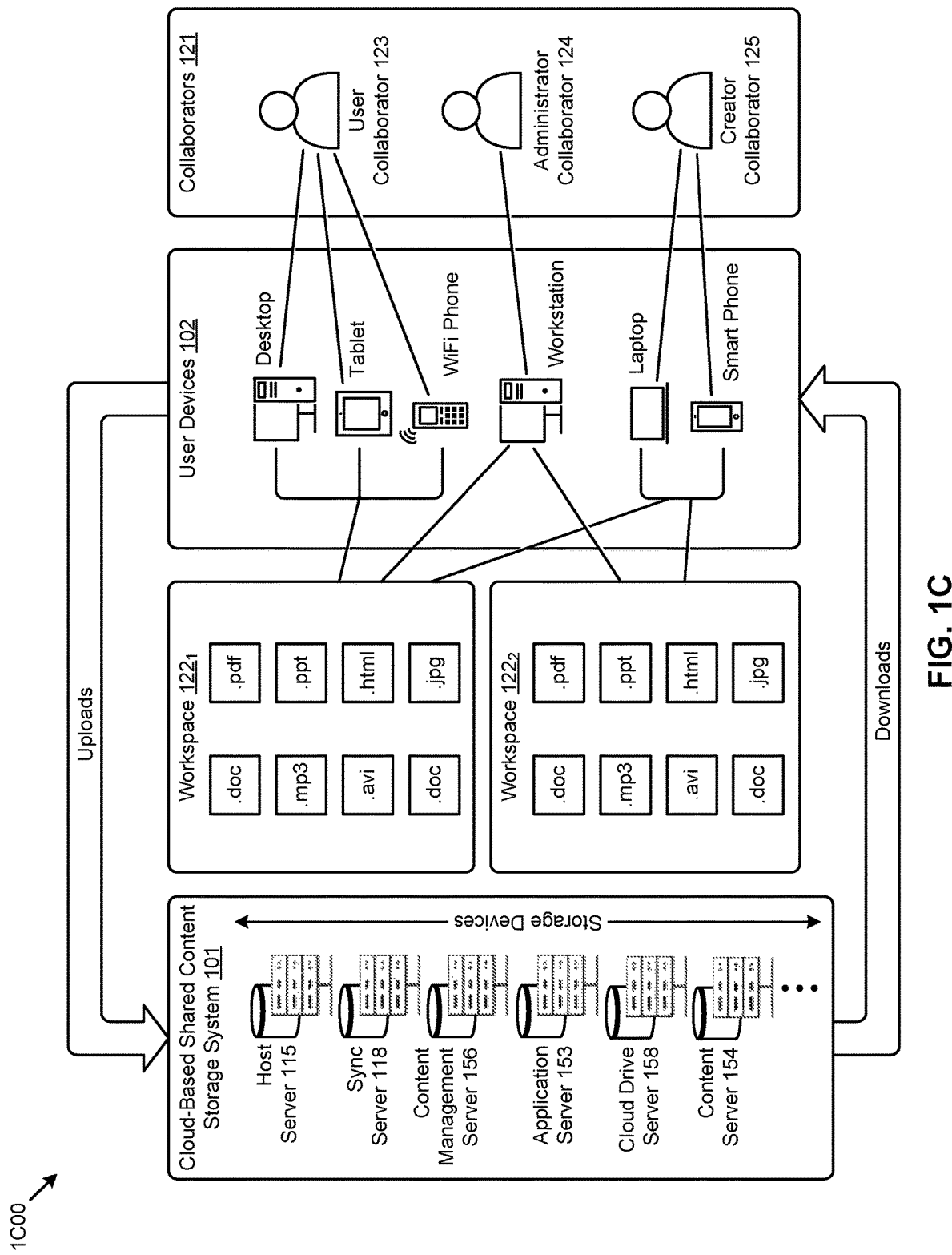
FIG. 1C depicts a cloud-based environment including a collaborative cloud-based shared content management platform that facilitates operation mapping in a virtual file system, according to an embodiment.

FIG. 1C depicts a cloud-based environment 1C00 including a collaborative cloud-based shared content management platform that facilitates operation mapping in a virtual file system. As an option, one or more variations of cloud-based environment 1C00 or any aspect thereof may be implemented in the context of the architecture and functionality of the embodiments described herein. The cloud-based environment 1C00 or any aspect thereof may be implemented in any environment.

As shown, certain users (e.g., collaborators 121) having various collaboration roles (e.g., user collaborator 123, administrator collaborator 124, creator collaborator 125, etc.) can use one or more instances of user devices 102 to interact with one or more workspaces (e.g., workspace $122_1$, workspace $122_2$, etc.) within the cloud-based environment 1C00. The workspaces can be stored in any location, and are at least partially maintained by components within a cloud-based shared content storage system 101. The cloud-based shared content storage system 101 supports any variety of processing elements and/or storage devices (e.g., a storage filer, a storage facility, etc.) and/or servers such as a host server 115, a sync server 118, a content management server 156, an application server 153, a cloud drive server 158, a content server 154, etc.

Any of the users can access shared content from the cloud-based shared content storage system 101 without the additional process of manually downloading and storing a file locally on an instance of the user devices 102 such as a desktop computer, a tablet, a WiFi phone, a workstation, a laptop, a smart phone, and/or other user devices. For example, a content object (e.g., computer file, text document, audio file, video file, image file, etc.) created by the creator collaborator 125 might be viewed by the user collaborator 123 without informing the user collaborator 123 where the file is physically stored in the storage devices. Such a facility streamlines the frequently repeated sharing and collaboration processes.

Functions and techniques performed by the cloud-based shared content storage system 101 and/or the client side components (e.g., user devices 102, a collaboration client and/or application on an instance of the user devices 102, etc.) are described herein with further details and with reference to several examples. Further details pertaining to implementing the herein disclosed techniques in the cloud-based environment 1C00 are described in FIG. 1D.

Figure 1D:
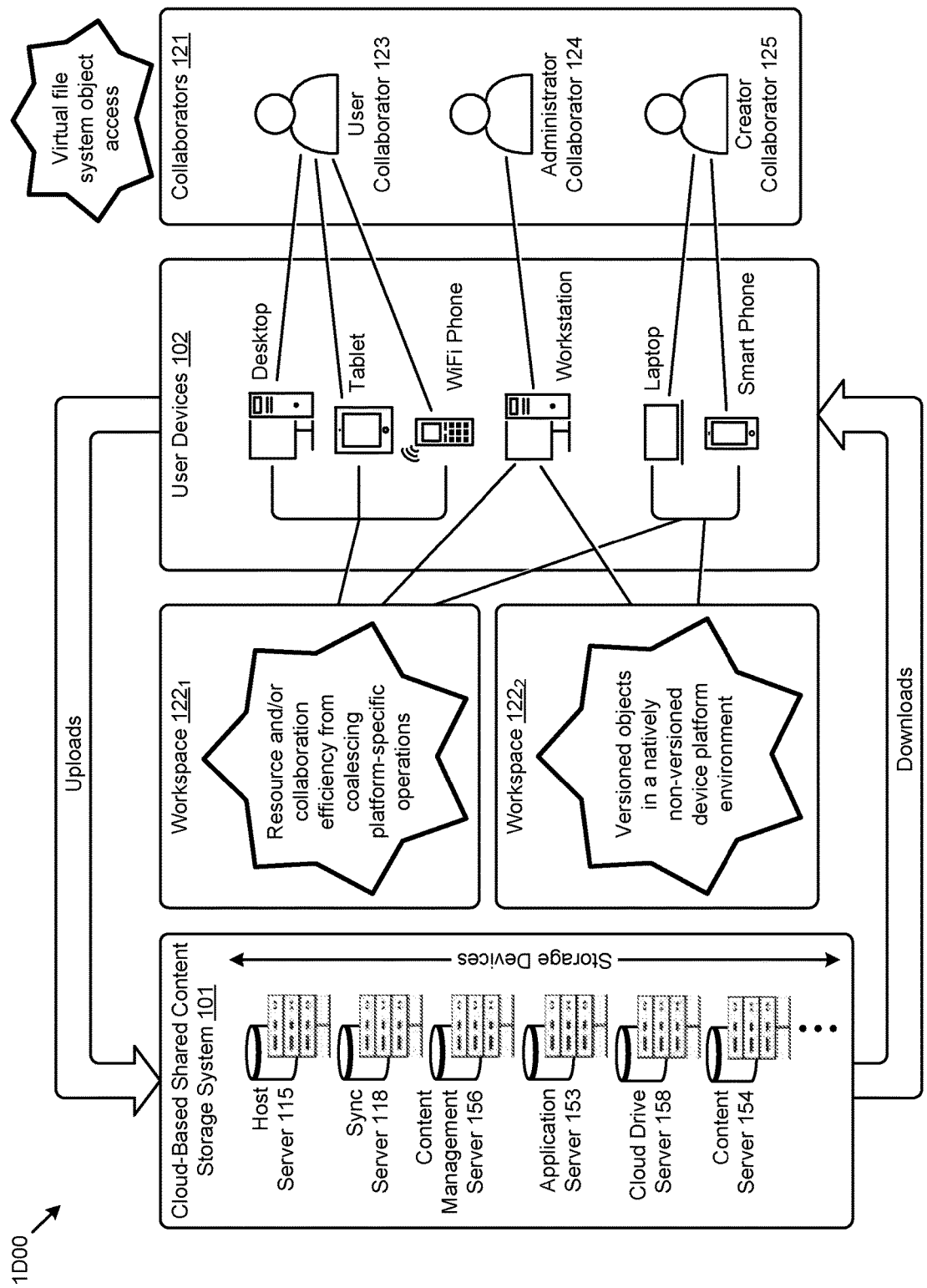
FIG. 1D presents a schematic view of a cloud-based environment having workspace activities that pertain to operation mapping in a virtual file system, according to an embodiment.

FIG. 1D presents a schematic view 1D00 of a cloud-based environment having workspace activities that pertain to operation mapping in a virtual file system. As an option, one or more variations of schematic view 1D00 or any aspect thereof may be implemented in the context of the architecture and functionality of the embodiments described herein. The schematic view 1D00 or any aspect thereof may be implemented in any environment.

The embodiment shown in FIG. 1D is merely one example of various activities and/or operations facilitated by the herein disclosed techniques for operation mapping in a virtual file system in a highly collaborative cloud-based environment. Specifically, and as shown, the collaborators 121 (e.g., the user collaborator 123, the administrator collaborator 124, and the creator collaborator 125) in the cloud-based environment might use an instance of the virtual file system on one or more of the user devices 102 to access various shared content (e.g., objects) stored in the storage devices of the cloud-based shared content storage system 101. As shown in workspace $122_1$, the herein disclosed virtual file system techniques can facilitate resource and/or collaboration efficiency from coalescing platform-specific operations (e.g., from each instance of the user devices 102) into calls to the cloud-based shared content storage system 101. Further, and as shown in workspace $122_2$, the herein disclosed virtual file system techniques can also track and/or manage object versions in a natively non-versioned user device platform environment.

One embodiment of a system for implementing the herein disclosed techniques for operation mapping in a virtual file system for cloud-based shared content is described as pertaining to FIG. 2.

FIG. 2 presents a schematic view 200 of interconnections between system components that cooperate to implement operation mapping in a virtual file system for cloud-based shared content. As an option, one or more variations of schematic view 200 or any aspect thereof may be implemented in the context of the architecture and functionality of the embodiments described herein. The schematic view 200 or any aspect thereof may be implemented in any environment.

FIG. 2 presents various system components in a local environment 250 and a cloud-based storage environment 260 that can be used to implement a virtual file system according to the herein disclosed techniques. Specifically, each instance of various user devices (e.g., user device $102_1$, user device $102_2$, ..., user device $102_N$) can run certain applications that can interface with a local instance of the virtual file system. More specifically, the user device $102_1$ is shown running an application $104_1$ that interacts with the virtual file system $186_1$. According to some embodiments, the virtual file system $186_1$ can comprise a file system interface $202_1$, a local data manager 204, a cloud executor 206, a file system executor 208, a remote data manager 210, and a local storage $212_1$. As shown, the local storage $212_1$ can comprise a local cache $214_1$ and a set of local metadata $196_1$. For example, the local cache $214_1$ might comprise one or more partitions of the local memory of the user device $102_1$. Further, the local metadata $196_1$ can comprise internal data structures for fast access. In some cases, such internal data structures can be protected (e.g., locked).

Further, data structures for the local metadata $196_1$ can hold a set of local metadata attributes 248, as shown. For example, the local metadata attributes 248 for each object accessible by the virtual file system $186_1$ might include a nodeID uniquely identifying a certain node in a file tree associated with the object, a type attribute describing the node and/or object type (e.g., folder, file, etc.), a remoteID uniquely identifying the object in the cloud-based storage environment 260, a version attribute describing the version of the object (e.g., from the perspective of the local environment 250), a name for the object, a localChange bit indicating a local change (e.g., bit=1) that has yet to be confirmed at the cloud-based storage environment 260, a set of permissions for the object (e.g., full access, view-only, unlocked, locked, etc.), one or more timestamps to indicate various events (e.g., last accessed, last modified, created, etc.), and/or other attributes. In some cases, the localChange bit might indicate that a local change has occurred merely for a short time, since it can be cleared (e.g., bit=0) when confirmation that the change was committed remotely has been received by the virtual file system $186_1$.

In other cases, the local metadata $196_1$ can be specific to the operating system (OS) of the user device. For example, the structure and/or attributes associated with the local metadata $196_1$ might be established at compile time of the virtual file system $186_1$ based at least in part on a target OS. As a specific example for a Mac OS, the local metadata attributes 248 might further include xattr extended attributes, a UID user identifier, and/or a groupID group identifier. As shown in the cloud-based storage environment 260, a content management server 156 can represent the various computing devices that carry out the operations of a cloud-based shared content storage platform (e.g., cloud-based shared content storage system 101 in FIG. 1C). The content management server 156 can access the storage devices 120 that can comprise the shared content 180, and/or the object metadata 194, and/or other data. As shown, the object metadata 194 can comprise certain instances of object metadata attributes 226 that characterize the objects 228 stored in the cloud-based storage environment 260.

For example, the object metadata attributes 226 might include certain attributes that characterize the location, version, permissions, access rules, and/or other characteristics of a given object. Further, the shared content 180 can store the objects 228 comprising the underlying data accessed by the various user devices in the local environment 250 using the herein disclosed techniques. In some cases, certain portions of the objects 228 might be stored in the local cache 214$_1$ (e.g., for low latency access), but the portion of the objects 228 stored in the shared content 180 can be substantially larger than the portion of the objects 228 stored in the local cache 214$_1$. For example, the user of the user device 102$_1$ might belong to an enterprise that owns large volumes of shared enterprise content that the user might need to access. However, the user device 102$_1$ might only be able to store a small portion of the shared enterprise content. Access to such large volumes of shared content stored on a remote cloud-based storage platform by multiple collaborators using resource-limited (e.g., memory-limited) local user devices can be facilitated by the embodiment of the herein disclosed virtual file system shown in FIG. 2.

Specifically, the user of the user device 102$_1$ might invoke various file system operations from the application 104$_1$ that are received by the file system interface 202$_1$ of the virtual file system 186$_1$. The file system interface 202$_1$ can interpret the file system calls (e.g., in an application-specific and/or OS-specific structure) for dispatch to the local data manager 204 in a structure common (e.g., platform-agnostic, OS-agnostic) to the virtual file system 186$_1$. In response to the dispatched call, the local data manager 204 can issue one or more commands and/or calls to the file system executor 208 and/or the cloud executor 206. For example, the file system executor 208 might process commands for the local environment 250, while the cloud executor 206 might process commands for the cloud-based storage environment 260. Specifically, the file system executor 208 can process commands and/or calls associated with the local storage 212$_1$ such as a change to the local metadata 196$_1$ and/or a change to the local cache 214$_1$. For example, an edit to a portion (e.g., chunk) of an object using the application 104$_1$ might invoke a call to the file system executor 208 to change various metadata attributes (e.g., version, size, last modified timestamp, etc.) in the local metadata 196$_1$ and/or change portions of the local cache 214$_1$ corresponding to the modified object chunk. In some cases, such operations by the file system executor 208 are invoked synchronously in response to the originating file system call dispatched from the file system interface 202$_1$.

In comparison, the cloud executor 206 can receive calls from the local data manager 204 into a work queue 242 for asynchronous delivery (e.g., see asynchronous messages 232$_1$) to the content management server 156 through the network 109. For example, the foregoing edit to a portion of an object using the application 104$_1$ might also invoke a call to the cloud executor 206 to change various object metadata attributes (e.g., version, size, last modified timestamp, etc.) in the object metadata 194 and/or change portions of the shared content 180 corresponding to the modified object chunk. Such operations can be issued from the work queue 242 as an instance of the asynchronous messages 232$_1$. As shown, the content management server 156 can receive such asynchronous messages from any and all (e.g., N) user devices of various collaborators. A conflict remediator 234 at the content management server 156 can reconcile the information (e.g., versions, object changes, etc.) received from the local environment 250 to deliver (e.g., broadcast) the reconciled information to the N user devices of the collaborators in a set of asynchronous messages 232$_2$. For example, the asynchronous messages 232$_2$ might include metadata updates and/or object updates. Such asynchronous updates can be received locally by a listener 244 at the remote data manager 210. The remote data manager 210 can schedule the received changes with the file system executor 208 to be applied to the local storage 212$_1$. This approach allows each collaborator to work asynchronously (e.g., independently) on various shared content, yet receive low latency (e.g., near real-time) updates pertaining to operations performed by other collaborators in a respective instance of the local environment 250.

The system components shown in FIG. 2 present merely one partitioning. The specific example shown is purely exemplary, and other partitioning is reasonable. The application of such systems, subsystems, and/or partitionings in a multi-platform user device environment is shown in FIG. 3A.

Figure 3A:
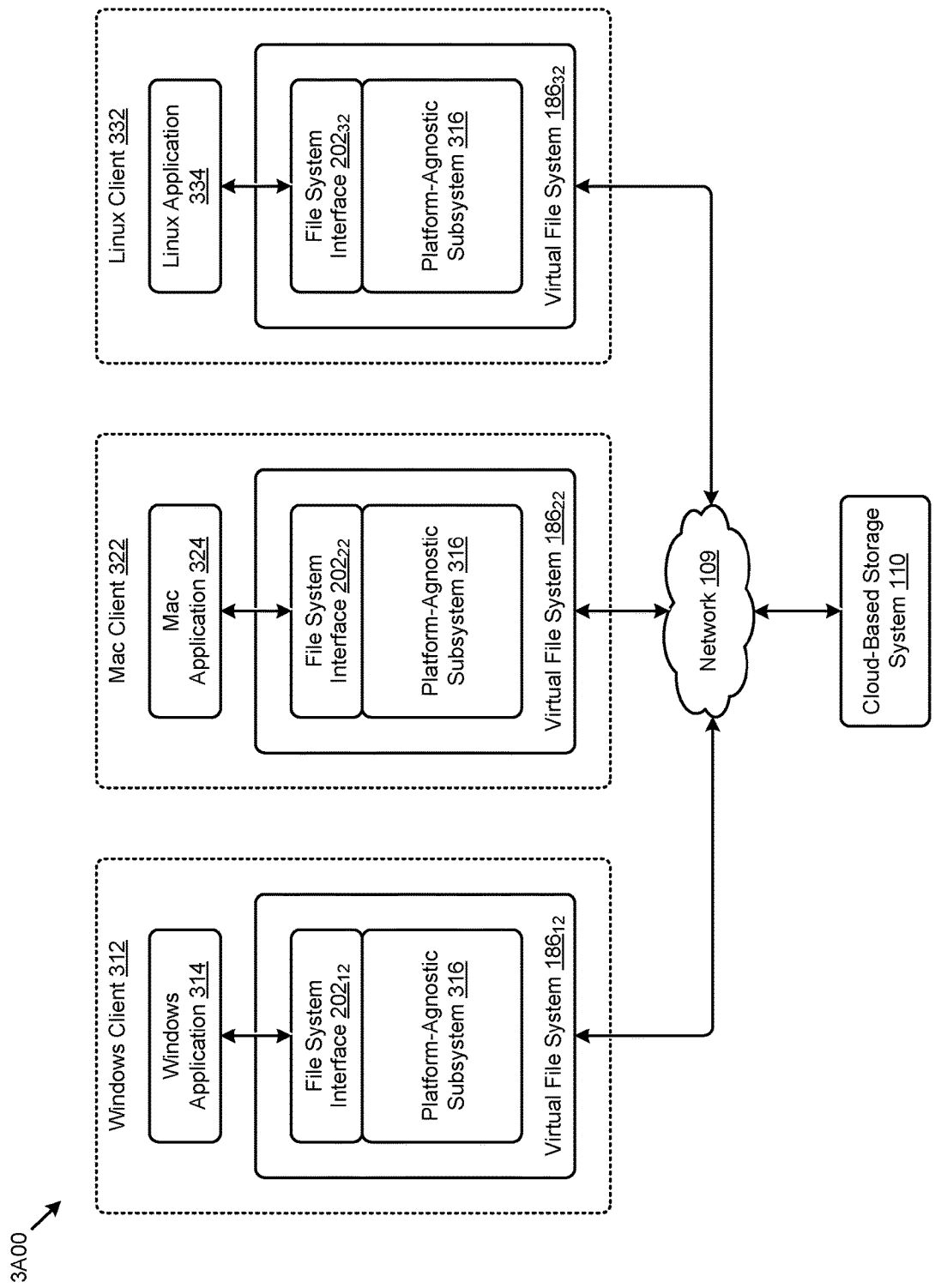
FIG. 3A depicts client platforms that implement a platform-agnostic virtual file system interface to facilitate operation mapping in a highly collaborative cloud-based environment, according to some embodiments.

FIG. 3A depicts client platforms 3A00 that implement a platform-agnostic virtual file system interface to facilitate operation mapping in a highly collaborative cloud-based environment. As an option, one or more variations of client platforms 3A00 or any aspect thereof may be implemented in the context of the architecture and functionality of the embodiments described herein. The client platforms 3A00 or any aspect thereof may be implemented in any environment.

The representative instances of the client platforms 3A00 shown in FIG. 3A comprise a Windows client 312, a Mac client 322, and a Linux client 332. Other clients representing other platforms (e.g., operating systems) are possible. The operating system at each client can have its own protocol for working (e.g., issuing file system calls) with a file system. Such protocols can differ among operating systems. The interface for interpreting these varying file system calls will therefore also differ among the operating systems.

The herein disclosed techniques can address such varying interface requirements across platforms, clients, operating systems, and/or protocols as shown in FIG. 3A. Specifically, the instances of a virtual file system (e.g., virtual file system 186$_{12}$, virtual file system 186$_{22}$, and virtual file system 186$_{32}$) delivered to each respective client (e.g., Windows client 312, Mac client 322, and Linux client 332, respectively) can comprise an interface layer (e.g., file system interface 202$_{12}$, file system interface 202$_{22}$, and file system interface 202$_{32}$, respectively). The file system interface can permit the native file system of the client to interface with a platform-agnostic subsystem 316 of the virtual file system.

As an example, the file system interface can translate and/or reorganize OS-specific and/or application-specific commands from the client applications (e.g., Windows application 314, Mac application 324, and Linux application 334) for dispatch to the internal structure of the platform-agnostic subsystem 316. Further, the file system interface can analyze messages between the native OS and the virtual file system to select certain messages and/or data to be transported. In some embodiments, various sets of file system interface functionality and corresponding kernel drivers may be implemented for the respective operating systems. For example, a file system interface code module specific for a target OS (e.g., WinFS.cpp, MacFS.cpp, LinuxFS.cpp, etc.) might be combined with the platform-agnostic subsystem code (e.g., "base" code) at compile time. Further, separate kernel drivers may be implemented at each client to allow calls to be placed to the platform-agnostic subsystem 316. For example, the Linux client 332 may use a FUSE (file system in user space) approach, the Mac client 322 may use a MacFUSE or an OSXFUSE approach, and the Windows client 312 may use a callback file system (CBFS) approach.

Figure 3B:
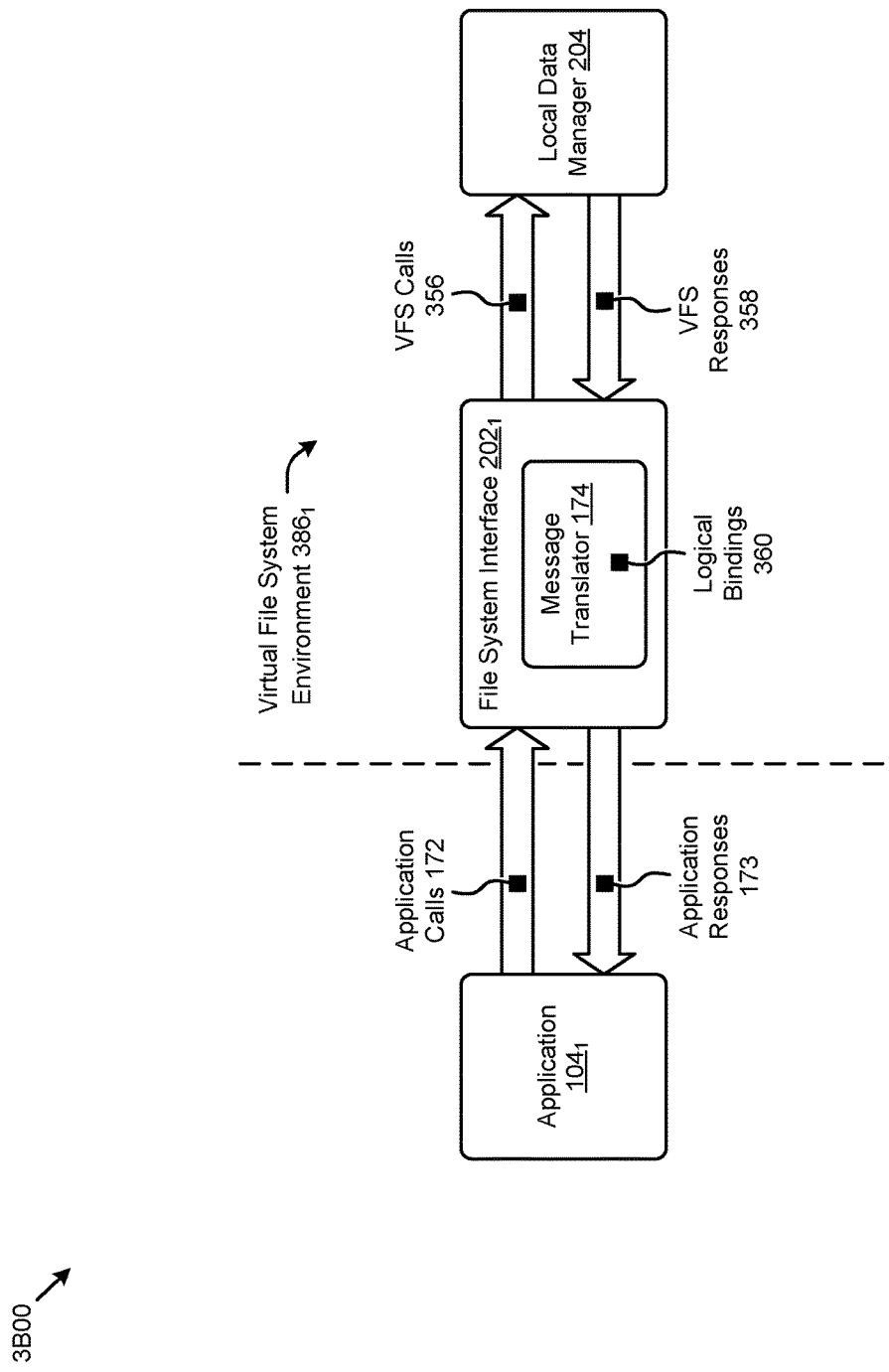
FIG. 3B is a diagram of a file system interface used to facilitate operation mapping in a virtual file system for cloud-based shared content, according to some embodiments.

Further details regarding techniques for implementing the foregoing file system interface are described in FIG. 3B, according to some embodiments.

FIG. 3B is a diagram of a file system interface 3B00 used to facilitate operation mapping in a virtual file system for cloud-based shared content. As an option, one or more variations of file system interface 3B00 or any aspect thereof may be implemented in the context of the architecture and functionality of the embodiments described herein. The file system interface 3B00 or any aspect thereof may be implemented in any environment.

The embodiment shown in FIG. 3B shows an instance of the file system interface $202_1$ and the local data manager 204 from the virtual file system environment $386_1$. The file system interface $202_1$ can interface with the application $104_1$ to receive occurrences of application calls 172 and issue the application responses 173. Such application messages can be in the native structure (e.g., syntax, semantics, types, parameters, classes, etc.) of the application $104_1$. As earlier described, some embodiments of the file system interface $202_1$ can comprise a code module (e.g., WinFS.cpp, MacFS.cpp, LinuxFS.cpp, etc.) specific for the target platform (e.g., OS) running the application $104_1$. Such application-specific functionality can serve to translate the application messages to virtual file system (VFS) messages that can be interpreted by the platform-agnostic components in the virtual file system environment $386_1$, such as the local data manager 204.

Specifically, a message translator 174 at the file system interface $202_1$ can translate the application calls 172 to corresponding instances of VFS calls 356 to the local data manager 204. Further, the message translator 174 can translate certain instances of VFS responses 358 from the local data manager 204 into corresponding instances of application responses 173 for the application $104_1$. For example, an onReadFile( ) call received from a Windows application and a read( ) call received from a Mac OS application can be translated by the message translator 174 to a common localDataMgr.readFile( ) call to the local data manager 204.

In addition to such syntax translations, the message translator 174 can further address other OS-specific and/or application-specific characteristics such as those pertaining to semantics (e.g., types, parameters, etc.), response data containers (e.g., return in message, place in empty buffer, etc.), error handling protocols (e.g., throw exceptions, return error codes, code variations, etc.), permissions, and/or other characteristics. As another example, permissions from Mac and Linux platforms using modes (e.g., 0644, 0755, etc.) and permissions from a Windows platform using multi-byte arrays can be mapped by the message translator 174 to a common VFS permissions structure (e.g., having a bits field for mode, and a security description field for BYTE ARRAY).

The foregoing examples are merely examples. Other events may arise for processing by the message translator 174. Table 1 lists additional examples.

TABLE 1

Example events

| Ref | Event Name |
| --- | --- |
| 1 | CleanupFile |
| 2 | CloseDirectory |

TABLE 1-continued

Example events

| Ref | Event Name |
| --- | --- |
| 3 | CloseFile |
| 4 | CreateFile |
| 5 | CreateHardLink |
| 6 | DeleteFile |
| 7 | EnumerateDirectory |
| 8 | FlushFile |
| 9 | GetFileInfo |
| 10 | GetFileSecurity |
| 11 | GetVolumeId |
| 12 | Mount |
| 13 | OpenFile |
| 14 | ReadFile |
| 15 | RenameOrMoveFile |
| 16 | Unmount |

Another example showing error handling pseudo-code that might be implemented by the message translator 174 is shown in Table 2.

TABLE 2

Error handling pseudo-code

| Ref | Pseudo-Code |
| --- | --- |
| 1 | try { |
| 2 | ... logic code ... |
| 3 | } catch (NodeNotFoundException) { |
| 4 | :Mac: return ENOENT; |
| 5 | :Win: throw new Error(FILE_NOT_FOUND); |
| 6 | } catch (...) { |
| 7 | ... more error handling code ... |
| 8 | } |

In some embodiments, the logic to carry out the foregoing translation functions can be codified in a set of logical bindings 360 in the message translator 174. Such bindings can be established at compile time for the target OS. For example, the logical bindings 360 might need to interact with a number of commands and/or functions in the kernel of the operating system (e.g., as might be related to the events of Table 1). Table 3 presents a subset of such commands.

TABLE 3

Example commands

| Ref | Event Name |
| --- | --- |
| 1 | getattr |
| 2 | readlink |
| 3 | getdir |
| 4 | mknod |
| 5 | mkdir |
| 6 | unlink |
| 7 | rmdir |
| 8 | symlink |
| 9 | rename |
| 10 | link |
| 11 | chmod |
| 12 | truncate |
| 13 | utime |
| 14 | open |
| 15 | read |
| 16 | write |

The platform-specific instance of the file system interface $202_1$ might further interact with a platform-specific instance of local metadata also established at compile time for the target OS. As earlier mentioned, such local metadata can comprise certain metadata attributes specific to the platform and/or OS.

Figure 3C:
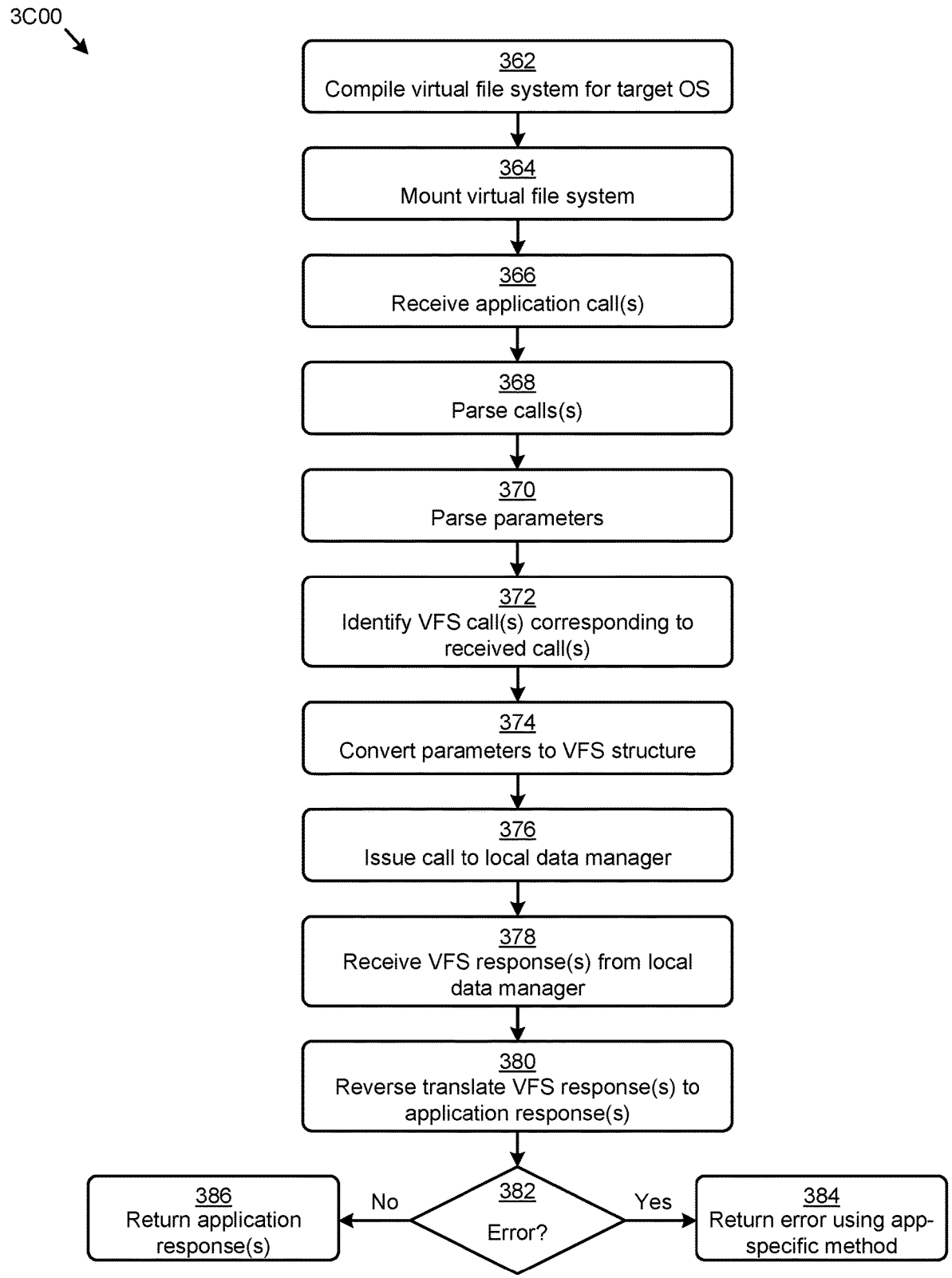
FIG. 3C depicts a message translation technique used to implement operation mapping in a virtual file system for cloud-based shared content, according to some embodiments.

A technique for translating messages using the file system interface 3B00 and/or other herein disclosed techniques is shown and described as pertaining to FIG. 3C.

FIG. 3C depicts a message translation technique 3C00 used to implement operation mapping in a virtual file system for cloud-based shared content. As an option, one or more variations of message translation technique 3C00 or any aspect thereof may be implemented in the context of the architecture and functionality of the embodiments described herein. The message translation technique 3C00 or any aspect thereof may be implemented in any environment.

The message translation technique 3C00 presents one embodiment of certain steps for interfacing between a platform-specific application and a platform-agnostic subsystem of a virtual file system implemented according to the herein disclosed techniques. In one or more embodiments, the steps and underlying operations shown in the message translation technique 3C00 can be executed by a message translator in a file system interface of a virtual file system, such as is described in FIG. 3B. As shown, the message translation technique 3C00 can commence with compiling a virtual file system for a certain target OS (see step 362). For example, in some embodiments, the virtual file system can have a platform-specific thin layer (e.g., wrapper), such as a file system interface, that can interface with a platform-agnostic base subsystem comprising the remainder of the virtual file system. The virtual file system can be mounted on the platform (e.g., user device), for example, when a certain application is launched (see step 364).

The file system interface of the virtual file system can then receive one or more application calls (see step 366). The received calls can be parsed (see step 368) to separate certain attributes of the calls (e.g., function, parameters, etc.). Specifically, the parameters might then be parsed (see step 370) so as to extract the lowest order of information in the calls. The message translation technique 3C00 can then identify the one or more VFS calls that correspond to the application calls (see step 372). Use of many-to-one message translation techniques can translate a set of platform-specific file system calls into one or more VFS calls that can be interpreted by a common platform-agnostic VFS subsystem. The many-to-one property of the translation is discussed in detail infra. Incoming streams of platform-specific file system calls can be received and processed such that a single call from a platform-specific file system can be translated into a single call in the VFS, and/or such that multiple calls from a platform-specific file system can be translated into a single call in the VFS, and/or such that multiple calls from a platform-specific file system can raise an explicitly incurred delay before the multiple calls are acted upon. For example, onEnumerateDirectory( ) on Windows is equivalent to the combination of readdir( ) and getattr( ) on Mac OS, either of which can translate to a single VFS call. Translating to/from an OS command (e.g., a platform-specific file system call) can result in a single VFS call or into many VFS calls, or vice-versa.

For example, a common VFS call localDataMgr.writeFile( ) can be identified for issuing to such a platform-agnostic subsystem based on receiving either an onWriteFile( ) call from Windows or a write( ) call from Mac OS. In some cases, the translation operation can by a one-to-many operation. For example, onSetFileAttributes( ) on Windows can translate to multiple VFS calls such as localDataMgr.setCreatedAtTimestamp( ), localDataMgr.setAccessedAtTimestamp( ), localDataMgr.setModifiedAtTimestamp( ), and localDataMgr.setFileAttributes( ).

The message translation technique 3C00 can further convert the parameters from the received application calls to the parameter structure corresponding to the VFS subsystem (see step 374). For example, parameters in a DWORD structure for Windows, or a char* structure for Mac OS, can be translated to a common VFS structure (e.g., std::string).

The resulting VFS call can be issued to the local data manager for processing by the virtual file system (see step 376). Based on the VFS call, the local data manager might provide a response that can be received by the file system interface wrapper (see step 378). The translation process can then be reversed to convert the VFS responses to application responses that can be interpreted by the application and/or operating system (see step 380). In some cases, the responses from the VFS might comprise one or more errors and/or exceptions. If no errors exist in the VFS responses (see "No" path of decision 382), the translated application responses can be returned to the application (see step 386). If one or more errors are included in the VFS responses (see "Yes" path of decision 382), further processing might be applied to the VFS responses. For example, an error code might need to be mapped from a VFS code to an application-specific code to be returned in a Mac OS and/or Linux environment, while an exception might need to be "thrown" in a Windows environment. When an appropriate application-specific error handling method has been determined, the error can be returned (see step 384). The invoking application call can be closed when the response (e.g., with or without error) has been returned.

Figure 4A:
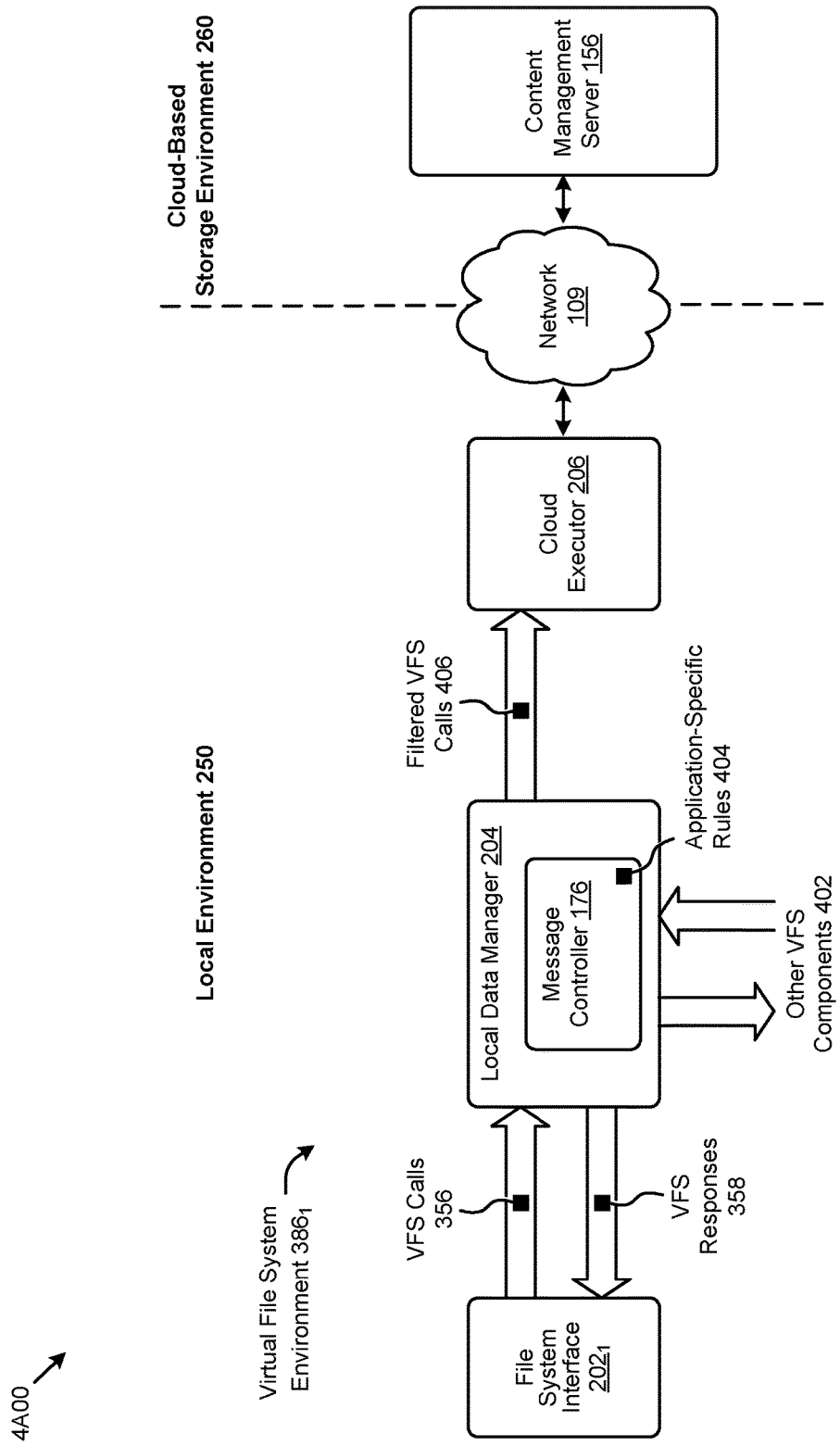
FIG. 4A presents a block diagram of a local data manager used to facilitate operation mapping in a virtual file system for cloud-based shared content, according to some embodiments.

Certain techniques for implementing the herein disclosed operation mapping in a virtual file system for cloud-based shared content can be related to the local data manager, as is described in FIG. 4A.

FIG. 4A presents a block diagram of a local data manager 4A00 used to facilitate operation mapping in a virtual file system for cloud-based shared content. As an option, one or more variations of local data manager 4A00 or any aspect thereof may be implemented in the context of the architecture and functionality of the embodiments described herein. The local data manager 4A00 or any aspect thereof may be implemented in any environment.

The embodiment shown in FIG. 4A shows an instance of the file system interface $202_1$, the local data manager 204, and the cloud executor 206 from the virtual file system environment $386_1$. The local data manager 204 can interface with the file system interface $202_1$ to receive the VFS calls 356 and issue the VFS responses 358. Such VFS messages can be in the common VFS structure (e.g., syntax, semantics, types, classes, etc.) of the platform-agnostic subsystem of the virtual file system. The local data manager 204 can further use such VFS structures to communicate with the other VFS components 402 included in the platform-agnostic subsystem of the virtual file system.

In some cases, a portion of the VFS calls 356 dispatched from the file system interface $202_1$ (e.g., from an originating application) to the local data manager 204 might potentially adversely impact the performance of the virtual file system. For example, a certain operating system and/or application might natively perform massive search indexing, automatic thumbnail generation, and/or other OS-specific and/or application-specific file system operations. Such OS-specific and/or or application-specific operations performed on a local file system might not adversely impact performance. However, such operations presented as VFS calls 356 to the local data manager 204 can adversely impact the performance of a virtual file system for cloud-based shared content in a highly collaborative environment. In some cases, certain OS-specific and/or application-specific operations presented as VFS calls 356 to the local data manager 204 might not be necessary to the functionality of the virtual file system.

A message controller 176 at the local data manager 204 can address such issues pertaining to OS-specific and/or application-specific operations. Specifically, the message controller 176 can monitor the VFS calls 356 to determine a set of filtered VFS calls 406 to dispatch to the cloud executor 206. More specifically, the message controller 176 can use a set of application-specific rules 404 to determine how a certain call can be dispositioned (e.g., blocked, delayed, dispatched, etc.). The application-specific rules 404 can codify a certain context associated with a given call and/or process based on, the process, the application state, the subject file attributes, the source OS, the local cache contents, and/or other criteria. One embodiment of a data structure for such application-specific rules is described in FIG. 4B.

FIG. 4B depicts a data structure 4B00 for managing application-specific operations in systems that implement operation mapping in a virtual file system for cloud-based shared content. As an option, one or more variations of data structure 4B00 or any aspect thereof may be implemented in the context of the architecture and functionality of the embodiments described herein. The data structure 4B00 or any aspect thereof may be implemented in any environment.

The data structure 4B00 shown in FIG. 4B is merely one example of a data structure for carrying the application-specific rules 404. As shown, the data structure 4B00 can have a table structure to hold a set of application-specific function attributes 424 comprising rows representing various processes (e.g., VFS calls) and columns representing various attributes associated with each process. As shown, for example, a given row might correspond to a certain process identified by a "Process ID" (e.g., 1204, 9834, 8388, etc.) associated with a process name (e.g., Finder, quickLookD, SearchProtocolHost.exe, etc.), a source platform (e.g., any, MacOS, Windows, etc.), a set of file attributes (e.g., file_extension=".boxnote", file_permission="blocked", file_local="0", etc.), a response (e.g., Open in browser, Return error 550, Ignore, etc.), and/or other attributes.

In certain embodiments, the attributes from the columns can be used in a set of logic in a message controller to filter the VFS calls received from an application and/or operating system by the virtual file system. For example, the message controller might analyze the filename associated with the readFile( ) command for process ID 1204 to determine the file_extension attribute. If file_extension=".boxnote", then the VFS might respond by not opening the file in the requesting application, but instead in a browser. As another example, a certain quickLookD request (e.g., process ID 8388) might be ignored if the requested file or files are not stored locally (e.g., file_local metadata attribute is "0"), but another quickLookD request (e.g., process ID 2426) might be executed if the requested file or files are stored locally (e.g., file_local metadata attribute is "1").

Figure 4C:
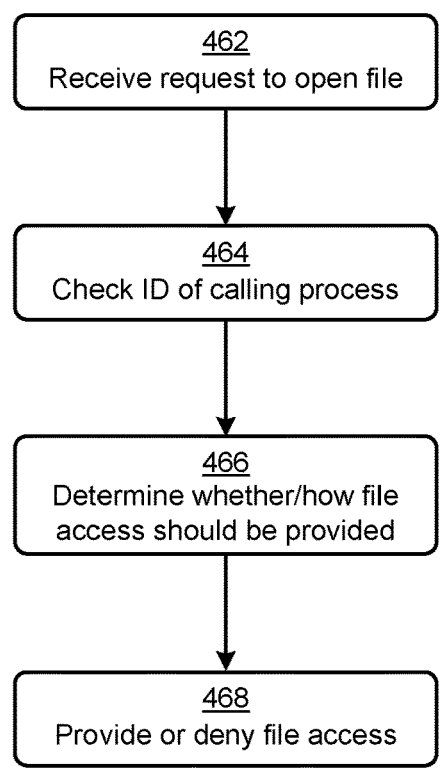
FIG. 4C depicts an application-specific operation management technique used to implement operation mapping in a virtual file system for cloud-based shared content, according to some embodiments.

One embodiment of a technique for processing certain application-specific operations using the application-specific rules and/or other herein disclosed techniques is described in FIG. 4C.

FIG. 4C depicts an application-specific operation management technique 4C00 used to implement operation mapping in a virtual file system for cloud-based shared content. As an option, one or more variations of application-specific operation management technique 4C00 or any aspect thereof may be implemented in the context of the architecture and functionality of the embodiments described herein. The application-specific operation management technique 4C00 or any aspect thereof may be implemented in any environment.

FIG. 4C shows a flowchart of an approach for managing application-specific actions according to some embodiments. Specifically, the application-specific operation management technique 4C00 can commence with a request (e.g., to open a file) being received in a virtual file system (VFS) implemented according to the herein disclosed techniques (see step 462). The ID for the calling process can be identified (see step 464). In most cases, the various applications interfacing with the virtual file system can have unique process IDs. Such unique process IDs can be used to distinguish between the different applications and/or types of applications that interact with the VFS (e.g., Finder, QuickTime, search indexer, etc.).

A determination can then be made whether and/or how access can be granted to the file (see step 466). Specifically, the process ID and process name can be checked to identify the specific application that is seeking access, which can be used at least in part to determine whether access should be granted. For example, the Spotlight application on MacOS may seek to index files in a directory accessible from the virtual file system. From a bandwidth and/or security point of view, this type of access may be problematic. Therefore, the virtual file system may recognize the process ID as being for Spotlight and in turn may determine to deny access to the directory (see step 468). As another example, the virtual file system may recognize the process ID as being for quickLookD (e.g., to generate thumbnails) and in turn may determine that file access should not be provided (to create thumbnails).

In some embodiments, additional information may be used to determine whether file access should be provided (see step 468). For example, current network conditions can be checked, and if a low bandwidth condition is detected, certain application access requests can be denied and/or delayed (e.g., until higher bandwidth conditions are detected). Further, security access settings can be checked to determine whether specific applications have the appropriate permissions to access certain files. Even if access is to be granted, then certain conditions may be placed upon that access depending upon the type of application that is seeking access. For example, maximum limits on downloads may be enforced to prevent excessive consumption of resources.

Figure 5A:
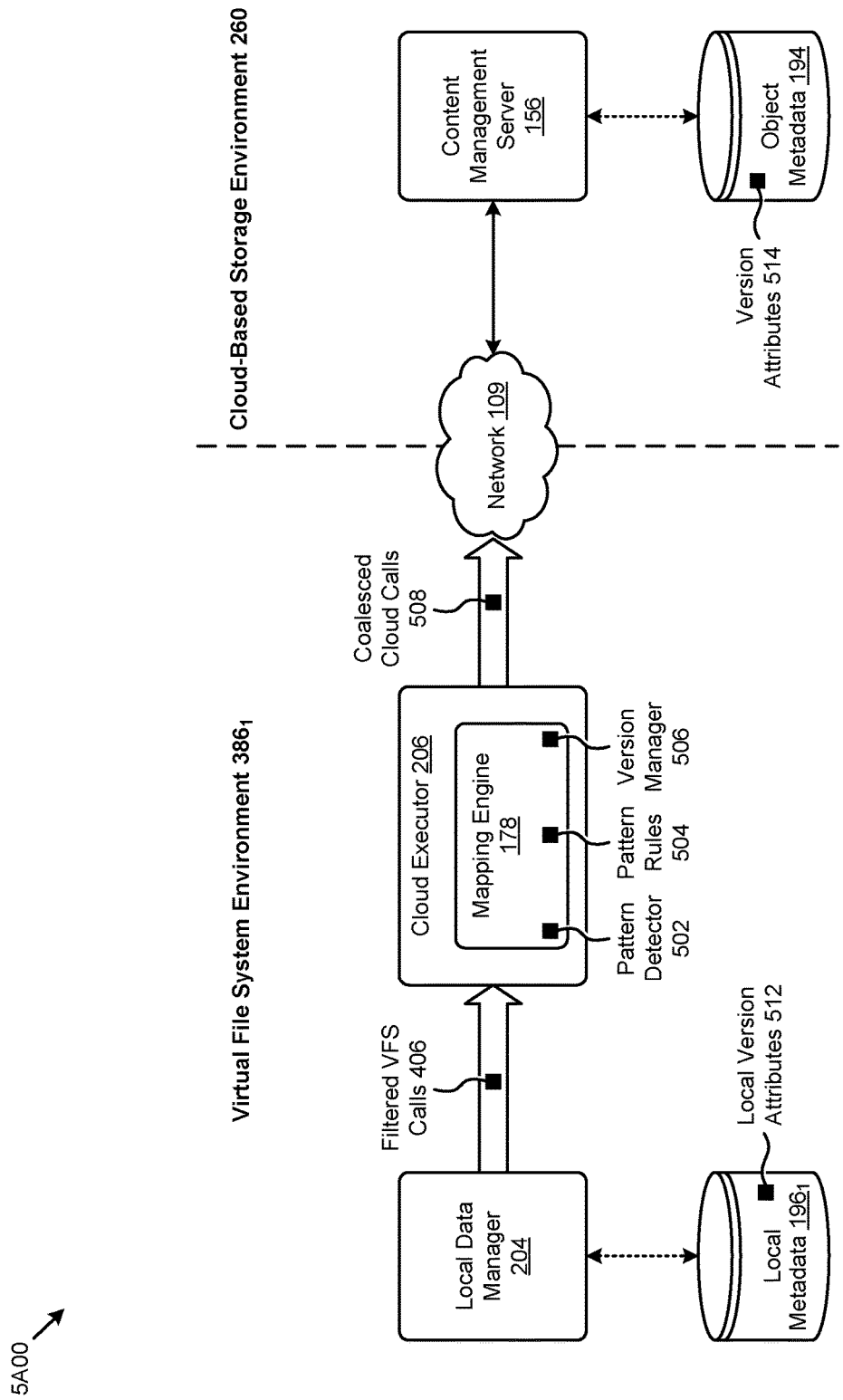
FIG. 5A is a diagram of a cloud executor used to facilitate operation mapping in a virtual file system for cloud-based shared content, according to some embodiments.

The VFS calls filtered by the foregoing techniques can be processed by a cloud executor as is described in FIG. 5A, according to some embodiments.

FIG. 5A is a diagram of a cloud executor 5A00 used to facilitate operation mapping in a virtual file system for cloud-based shared content. As an option, one or more variations of cloud executor 5A00 or any aspect thereof may be implemented in the context of the architecture and functionality of the embodiments described herein. The cloud executor 5A00 or any aspect thereof may be implemented in any environment.

The embodiment shown in FIG. 5A shows the local data manager 204 and the cloud executor 206 from the virtual file system environment $386_1$. As shown, the local data manager 204 can dispatch various instances of filtered VFS calls 406 to the cloud executor 206 that can be used to communicate, over the network 109, with the content management server 156 in the cloud-based storage environment 260. As earlier described, the cloud executor 206 can receive the filtered VFS calls 406 from the local data manager 204 into a work queue for asynchronous delivery to the content management server 156 through the network 109. For example, the filtered VFS calls 406 might invoke one or more calls to the content management server 156 to change various object metadata attributes (e.g., version, size, last modified timestamp, etc.) in the object metadata 194 and/or change portions of the shared content in the cloud-based storage environment 260. While one instance of the virtual file system environment 386$_1$ is shown in FIG. 5A (e.g., corresponding to one user device), the content management server 156 can receive such asynchronous messages from any and all the user devices of various collaborators. In a highly collaborative cloud-based environment, the calls to the content management server 156 from multiple instances of the cloud executor can consume large amounts of network bandwidth and/or adversely impact the performance of the virtual file system at the respective local user devices, impacting collaboration efficiency and/or effectiveness.

According to some embodiments, a mapping engine 178 at the cloud executor 206 can address such issues. Specifically, the mapping engine 178 can monitor the filtered VFS calls 406 to determine a set of coalesced cloud calls 508 to dispatch to the content management server 156. More specifically, the mapping engine 178 can use a pattern detector 502 to detect certain patterns in the filtered VFS calls 406 that can be applied to a set of pattern rules 504 to determine the coalesced cloud calls 508. With this approach, including the disclosed aspects of filtering the application calls, calls to the cloud-based storage environment 260 among multiple collaborators can be reduced (e.g., minimized, coalesced, and/or otherwise optimized). In some cases, the mapping engine 178 can map several (e.g., four to five) VFS calls to one atomic call to the API (e.g., public API) of the content management server 156.

According to certain embodiments, the mapping engine 178 at the cloud executor 206 and/or other techniques described herein can further facilitate operation and/or event normalization in the virtual file system environment 386$_1$. As described herein, operation and/or event normalization is performed in some embodiments to correlate actions at various instances of a local platform (e.g., local client) to corresponding actions that should be taken at the cloud-based storage system accessed by a virtual file system. As an example, a file might be opened at a local user device by a text editor that is configured to perform autosave operations on a periodic basis. The autosave operations might not be intended to save a new version of the file, but create a backup copy of the file so that changes can be recovered in the event of a device or application failure. In such cases, the autosave operation might comprise multiple file system actions (e.g., calls), including: (a) create a temporary file, (b) write the new file data to the temporary file, (c) rename the original file to a second temporary name, (d) rename the first temporary file to the original file name; and (e) delete the original file that now has the second temporary file name. In some cases, the autosave operation and/or other such actions can be performed by a class of operations called "atomic save" operations.

However, some cloud-based storage systems may not distinguish between certain atomic save operations intended to create a new file and other atomic save operations intended to edit an existing document. In such cases, executing the foregoing autosave operation sequence might create a new version of the file at each periodic iteration. Further, executing the foregoing autosave pattern at the cloud-based storage system may delete the past versions of the original file. In such cases, the ability to retrieve earlier versions of the file can be affected. Such issues can result in an expensive (e.g., in terms of computing and/or storage resources) creation of a large volume of possibly unnecessary file versions at the cloud-based storage system. Such issues can also result in loss of comment history, loss of access logs, loss of associated metadata, etc.

Operation and/or event normalization provided by the herein disclosed techniques (e.g., the mapping engine 178 at the cloud executor 206) can view the client actions (e.g., represented by the filtered VFS calls 406) in a certain context to determine a set of intended actions (e.g., coalesced cloud calls 508) for the cloud-based storage environment 260. For the foregoing autosave example, a sequence of filtered VFS calls 406 corresponding to the "create T1", "write to T1", "rename O to T2", "rename T1 to O", and "delete T2" operations at the text editor application might be normalized (e.g., mapped) by the mapping engine 178 to a single "new version" call to the content management server 156 from the cloud executor 206. In some cases, normalization of an autosave sequence in certain contexts (e.g., when autosave is not required) might result in no call to the cloud-based storage environment 260. As another example, a rapid sequence of "save" operations (e.g., from multiple user clicks of the "Save" button) at the local client may be normalized into a single "edit" operation to the cloud-based storage environment 260.

A version manager 506 at the cloud executor 206 can further facilitate versioning of content accessed through the virtual file system environment 386$_1$—even when the content originates from, or is accessed from, a natively non-versioned environment. For example, such a natively non-versioned environment might correspond to the aforementioned Windows, Mac OS, and/or Linux platforms. Specifically, such versioning can be facilitated at least in part by certain version attributes that can be included in the coalesced cloud calls 508. Such version attributes can be collected, reconciled among collaborators, and stored by the content management server 156 in the object metadata 194 (e.g., see version attributes 514). The version attributes 514 can be broadcast from the cloud-based storage environment 260 to each local instance of the virtual file system environment 386$_1$ corresponding, for example, to a respective collaborator user device. The local instance of the virtual file system can reconcile the broadcasted instances of the version attributes 514 with the local version attributes 512 stored in the local metadata (e.g., local metadata 196$_1$) at each user device. In some embodiments, a version manager 506 can identify the instances of the coalesced cloud calls 508 that should include versioning information (e.g., version attributes).

The coalesced cloud calls 508 used to carry such versioning information and/or attributes can be determined at least in part from the pattern rules 504, according to some embodiments. One embodiment of a data structure for such pattern rules is described in FIG. 5B.

FIG. 5B presents an operation pattern data structure 5B00 used for detecting operation patterns to implement operation mapping in a virtual file system for cloud-based shared content. As an option, one or more variations of operation pattern data structure 5B00 or any aspect thereof may be implemented in the context of the architecture and functionality of the embodiments described herein. The operation pattern data structure 5B00 or any aspect thereof may be implemented in any environment.

The operation pattern data structure 5B00 shown in FIG. 5B is merely one example of a data structure for carrying the pattern rules 504. Such pattern rules serve to characterize an association between, a sequence (e.g., operation pattern) of application calls and/or virtual file system calls (e.g., VFS calls), and one or more coalesced cloud calls. In some cases, many application and/or VFS calls can be mapped to one coalesced cloud call based in part on the pattern rules 504. As shown, the operation pattern data structure 5B00 can provide such mapping using a table structure to hold a set of pattern attributes 524 comprising rows representing various patterns, and columns characterizing the attributes and corresponding coalesced cloud call associated with each pattern. As shown, for example, a given row might correspond to a certain pattern identified by a "Pattern ID" (e.g., 23, 11, 02, etc.) associated with a high-order "Operation Description" (e.g., Delete Folder, Rich Text Editor Save1, etc.), a sequence of calls comprising an "Operation Pattern" (e.g., create[X]; edit[X], etc.), a corresponding "Cloud Call" (e.g., delFolder[X], newVersion[X], etc.), and/or other attributes.

In certain embodiments, the attributes from the columns can be used in a set of logic in a mapping engine and/or pattern detector in a virtual file system to identify the cloud calls to issue in response to certain operation patterns invoked by various applications interacting with the virtual file system. For example, the mapping engine might detect from the incoming VFS calls the operation pattern identified by the pattern ID 11. Such a Rich Text Editor Save1 operation might correspond to a Microsoft Word "Save" event in a Windows environment, or an operation might correspond to a Sublime Text Editor "Save" event. In such cases, only one newVersion[X] (e.g., where x refers to the subject file) cloud call might be required to be issued to the cloud-based storage environment associated with the virtual file system. As shown in this example, four calls from the native application (e.g., Microsoft Word, Sublime, etc.) can be mapped (e.g., coalesced) into one cloud call. In some embodiments, a certain set of patterns and combinations of those patterns can comprise an exhaustive representation of all possible patterns.

As indicated by the example patterns shown in FIG. 5B, many native file system patterns can be coalesced to a newVersion[X] call facilitated by the versioned file system provided by the herein disclosed techniques. In such cases, the herein disclosed techniques can deliver operating mapping benefits (e.g., normalization) and versioning benefits (e.g., collaborative version tracking). Certain embodiments of techniques for delivering such benefits are described in FIG. 5C, FIG. 5D, and FIG. 5E.

Figure 5C:
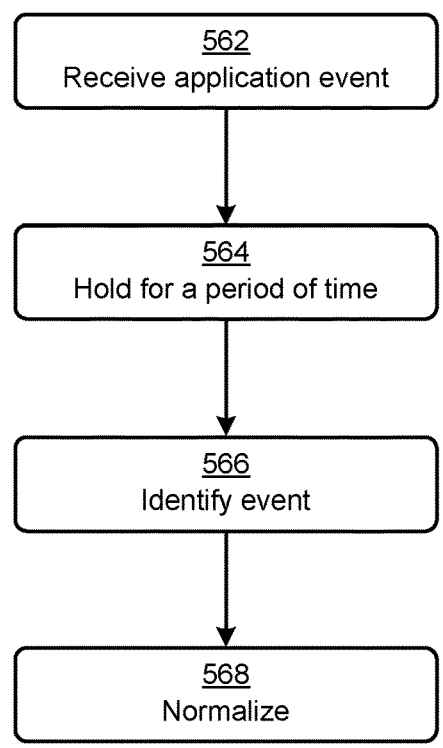
FIG. 5C depicts an operation normalization technique as implemented in a virtual file system for a highly collaborative cloud-based environment, according to some embodiments.

FIG. 5C depicts an operation normalization technique 5C00 as implemented in a virtual file system for a highly collaborative cloud-based environment. As an option, one or more variations of operation normalization technique 5C00 or any aspect thereof may be implemented in the context of the architecture and functionality of the embodiments described herein. The operation normalization technique 5C00 or any aspect thereof may be implemented in any environment.

FIG. 5C shows a flowchart of an operation normalization technique 5C00 facilitated by certain embodiments of the herein disclosed techniques. Specifically, the operation normalization technique 5C00 can commence by receiving an application event for processing (see step 562). For example, the application event might correspond to one or more calls (e.g., sequence of calls) from an application to a virtual file system as implemented according to the herein disclosed techniques. In some cases, a certain period of time can be allowed to elapse before processing the application event (see step 564). The elapsed time might facilitate receiving an entire sequence of calls for a given event so as to determine the intent of the event as it pertains to corresponding interactions with a cloud-based storage system that might be necessary. For example, the earlier described autosave operation from a text editor application can comprise multiple actions involving the original file and temporary files. The foregoing delay period (e.g., a 10-second delay period) can provide sufficient time to capture the entire sequence associated with a given event. Different received patterns can be analyzed to match to a predefined pattern or subpattern. Different actions can be taken based on the match. In some cases a predefined pattern is a combination or permutation of predefined patterns or subpatterns. Table 4 presents an exemplary set of predefined patterns and subpatterns together with corresponding actions taken when the pattern or subpattern is matched.

TABLE 4

Action examples

| Example Pattern of Received Commands | Action(s) Taken |
|---|---|
| •<br>•<br>•<br>Write T1<br>Write T1<br>•<br>•<br>• | Reset delay period every time an intermediate pattern event is received |
| Create T1<br>Rename O->T2<br>Rename T1->O<br>Delete T2 | Immediately normalize and execute |
| Rename O->T1<br>Delete T1<br>Create T1<br>Rename O->T2<br>Delete T2 | Immediately execute without normalization<br>Immediately execute<br>[read O->T2, delay T2] events; delay [create T1] |

When an incoming sequence of commands corresponding to the application event is captured, the application event can be identified (e.g., an autosave event from a particular process having a respective process ID) (see step 566). In some cases, a mapping table and/or set of mapping rules can be provided to facilitate performing this step. The identified application event can then be normalized for processing (see step 568). In some cases, the normalizing can result in no action being taken (e.g., if the autosave is not intended to create a new version at the cloud-based storage system). In other cases, normalization can convert a sequence of virtual file system calls from the local client to one or more cloud calls to the cloud-based storage system.

Figure 5D:
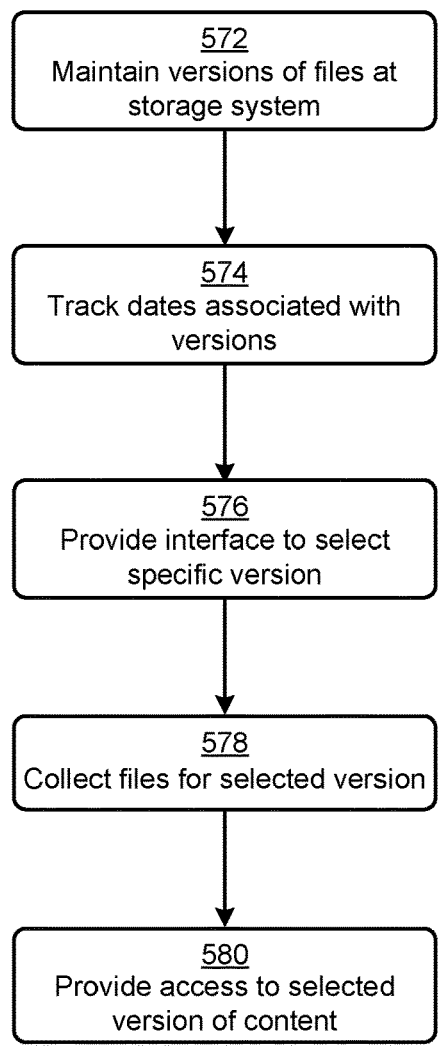
FIG. 5D depicts a version tracking technique as used in systems for operation mapping in a virtual file system for cloud-based shared content, according to some embodiments.

FIG. 5D depicts a version tracking technique 5D00 as used in systems for operation mapping in a virtual file system for cloud-based shared content. As an option, one or more variations of version tracking technique 5D00 or any aspect thereof may be implemented in the context of the architecture and functionality of the embodiments described herein. The version tracking technique 5D00 or any aspect thereof may be implemented in any environment.

Some embodiments described herein can implement a versioned file system using a virtual file system. The versioned file system facilitates user access to any version of the objects managed by the file system (e.g., the virtual file system) at various moments in time. As earlier described, applications operating in an environment and/or platform having a non-versioned native file system can access the versioning capabilities of such a versioned file system using the herein disclosed techniques.

As an example, FIG. 5D shows a flowchart of a version tracking technique 5D00 facilitated by certain embodiments of the herein disclosed techniques. Specifically, the version tracking technique 5D00 can commence with different versions of files represented by the virtual file system being maintained by a cloud-based storage system that stores the files (see step 572). As an example, metadata can be used to track the version attributes (e.g., time, date, etc.) associated with the various versions (see step 574). A user interface can be provided to allow the user to select a specific version of any or all objects (e.g., files) accessible through the virtual file system (see step 576). An example interface may include a slider control, where the slider can be dragged from one end representing the oldest version to the other end representing the most recent version. When a version representing the entire virtual file system is selected (e.g., for full system recovery), the files for the selected version can be collected (see step 578). For example, the metadata associated with the different versions of the files maintained at the cloud-based storage system can be analyzed to identify the files to be associated with the selected version. Access to the selected version of content can then be provided (see step 580). For example, the set of metadata corresponding to the objects comprising the selected version and/or versions can be marked as "currently selected" to facilitate access to the cloud-based objects from one or more local user devices.

Figure 5E:
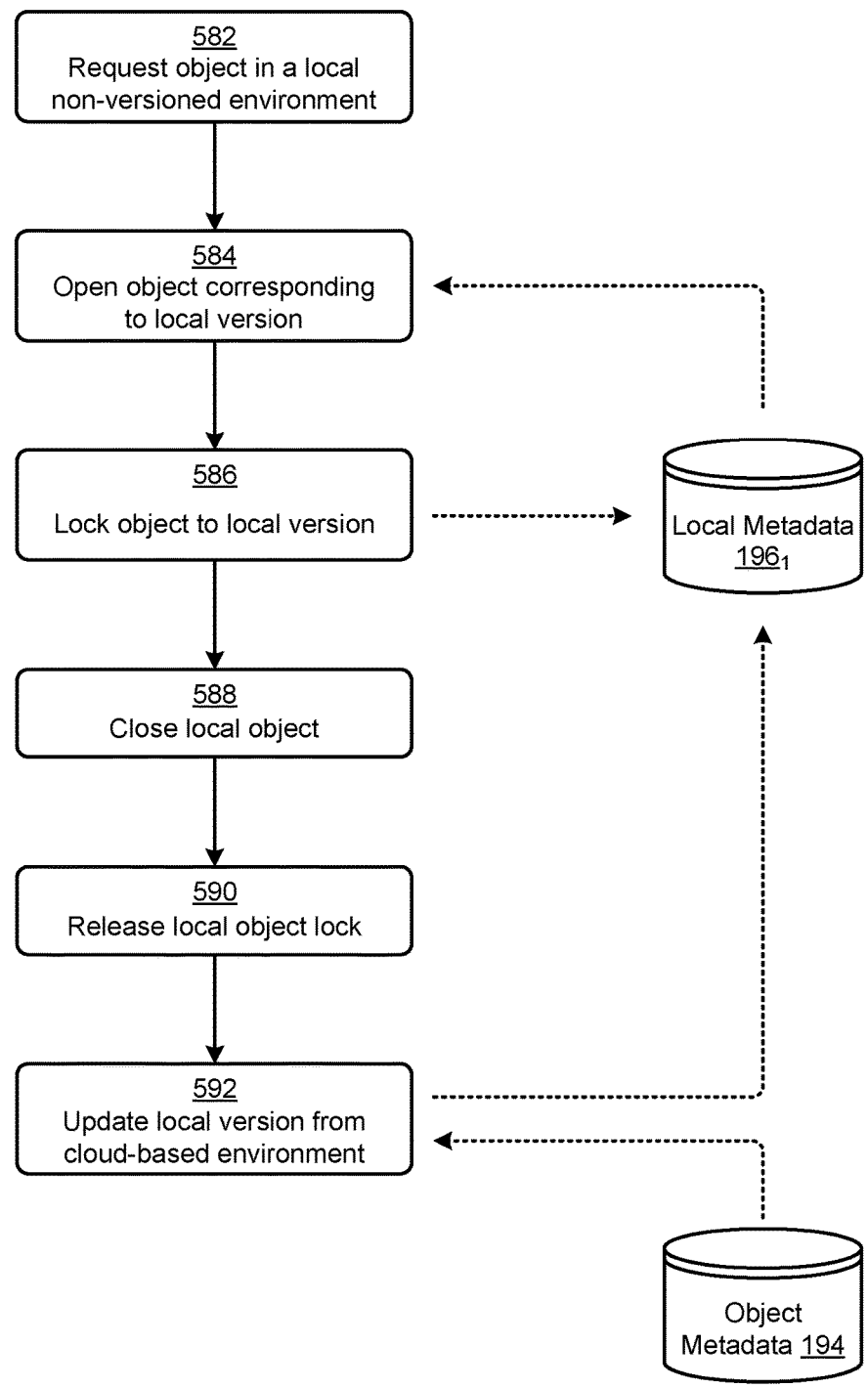
FIG. 5E depicts a versioning technique as used in systems for operation mapping in a virtual file system for cloud-based shared content, according to some embodiments.

FIG. 5E depicts a versioning technique 5E00 as used in systems for operation mapping in a virtual file system for cloud-based shared content. As an option, one or more variations of versioning technique 5E00 or any aspect thereof may be implemented in the context of the architecture and functionality of the embodiments described herein. The versioning technique 5E00 or any aspect thereof may be implemented in any environment.

The versioning technique 5E00 presents one embodiment of certain steps for implementing object versioning in a natively non-versioned environment using a virtual file system implemented according to the herein disclosed techniques. In one or more embodiments, the steps and underlying operations shown in the versioning technique 5E00 can be executed by a version manager and/or other components of a virtual file system, such as is described in FIG. 5A and throughout this specification. As shown, the versioning technique 5E00 can commence with requesting an object from a local non-versioned environment (see step 582). For example, the object request might be issued to a virtual file system (VFS), as described herein, implemented on a local platform (e.g., user device) having a non-versioned native file system. The VFS can be configured to access certain objects (e.g., the requested object) from a cloud-based storage system. The VFS can check the local metadata (e.g., local metadata $196_1$) to open the version of the object indicated by the local version attributes in the local metadata (see step 584). In most cases, the local version attributes (e.g., version=v4) can correspond to the version attributes captured in the object metadata (e.g., object metadata 194) at the cloud-based storage system. The local version attributes can be continually updated by the cloud-based storage system.

When the object is opened locally, the object can be locked to the local version (see step 586). For example, such a local lock can prevent version updates (e.g., v5, v6, etc.) at the cloud-based storage system (e.g., from other collaborators) from being pushed to the local metadata, potentially conflicting with the opened local object. When the local object is closed (see step 588), the local lock can be released (see step 590). When the local lock is released, the local version attributes (e.g., in the local metadata $196_1$) can be updated with the most recent version attributes (e.g., from the object metadata 194) from the cloud-based storage system (see step 592).

Additional Embodiments of the Disclosure

Additional Practical Application Examples

Figure 6A:
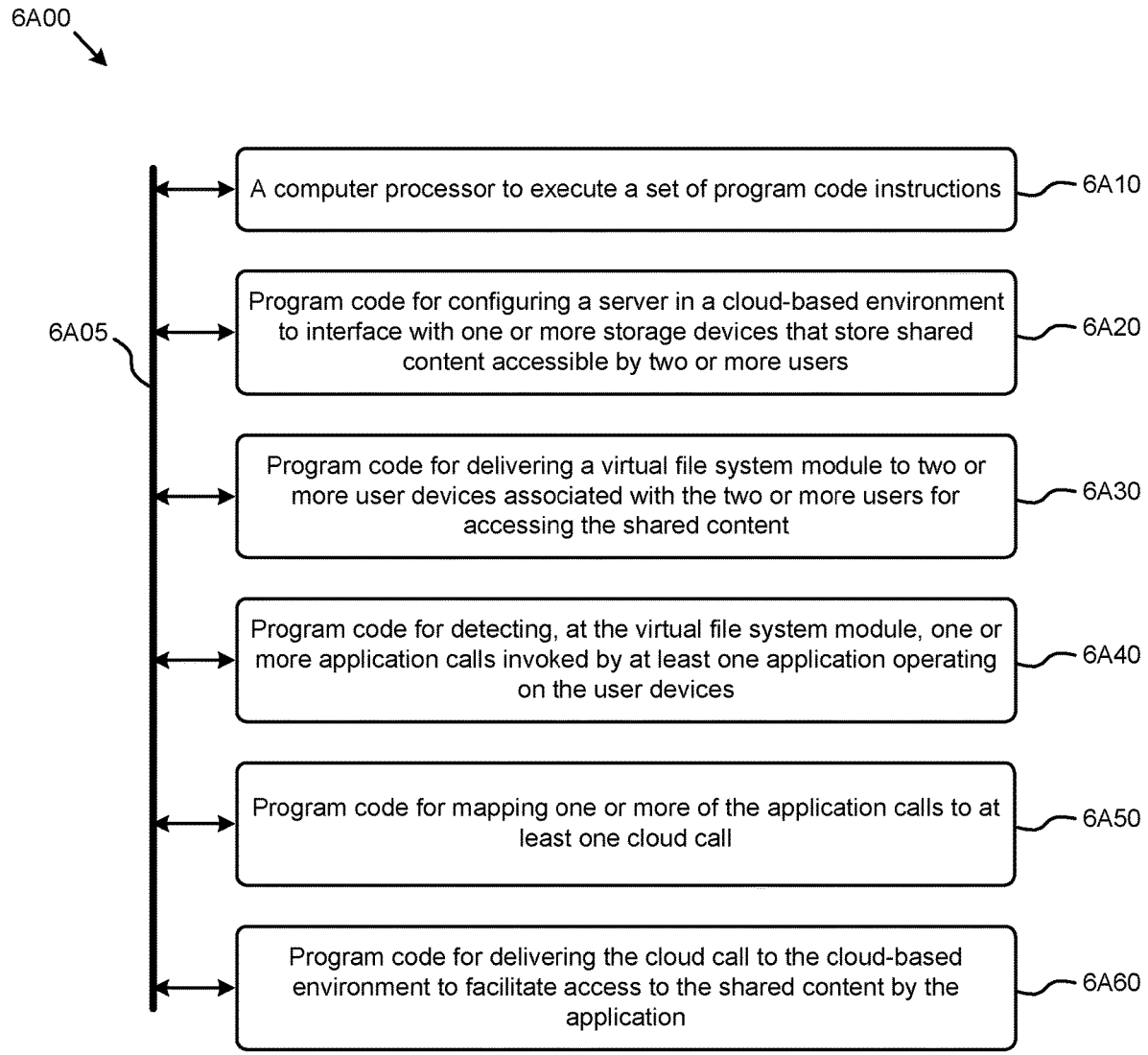
FIG. 6A, FIG. 6B and FIG. 6C depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible.

FIG. 6A depicts a block diagram of a system to perform certain functions of a computer system. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims.

The shown embodiment implements a portion of a computer system, presented as system 6A00, comprising a computer processor to execute a set of program code instructions (see module 6A10) and modules for accessing memory to hold program code instructions to perform: configuring a server in a cloud-based environment to interface with one or more storage devices that store shared content accessible by two or more users (see module 6A20); delivering a virtual file system module to two or more user devices associated with the two or more users for accessing the shared content (see module 6A30); detecting, at the virtual file system module, one or more application calls invoked by at least one application operating on the user devices (see module 6A40); mapping one or more of the application calls to at least one cloud call (see module 6A50); and delivering the cloud call to the cloud-based environment to facilitate access to the shared content by the application (see module 6A60).

Variations of the foregoing may include more or fewer of the shown modules and variations may perform more or fewer (or different) steps, and/or may use data elements in more, or fewer, or different operations.

Strictly as examples, some variations include:

Variations where mapping the application calls to the cloud call is based at least in part on one or more pattern rules, the pattern rules characterizing an association between an operation pattern and the cloud call.

Variations where the operation pattern comprises a sequence of one or more of the application calls.

Variations further comprising translating one or more of the application calls to at least one virtual file system call for mapping to the cloud call.

Variations where translating the application calls is based at least in part on one of, a syntax, a semantic, a type, a parameter, or a class, associated with the application calls.

Variations that include translating at least one virtual file system response to one or more application responses and delivering the application responses from the virtual file system module to the application.

Variations where translating the virtual file system response is based at least in part on one of, a permission, a response data container, or an error handling protocol, associated with the application responses.

Variations where the application responses comprise at least one error response.

Variations further comprising acts for filtering the application calls based at least in part on a set of application-specific rules.

Variations where the application-specific rules are based at least in part on at least one of, a process identifier, a process name, a source platform, or a file attribute.

Variations further comprising acts of determining one or more version attributes to include in the cloud call based at least in part on the application calls.

Variations further comprising acts for managing the version attributes to implement a versioned file system on platforms that do not have a native file versioning capability.

Figure 6B:
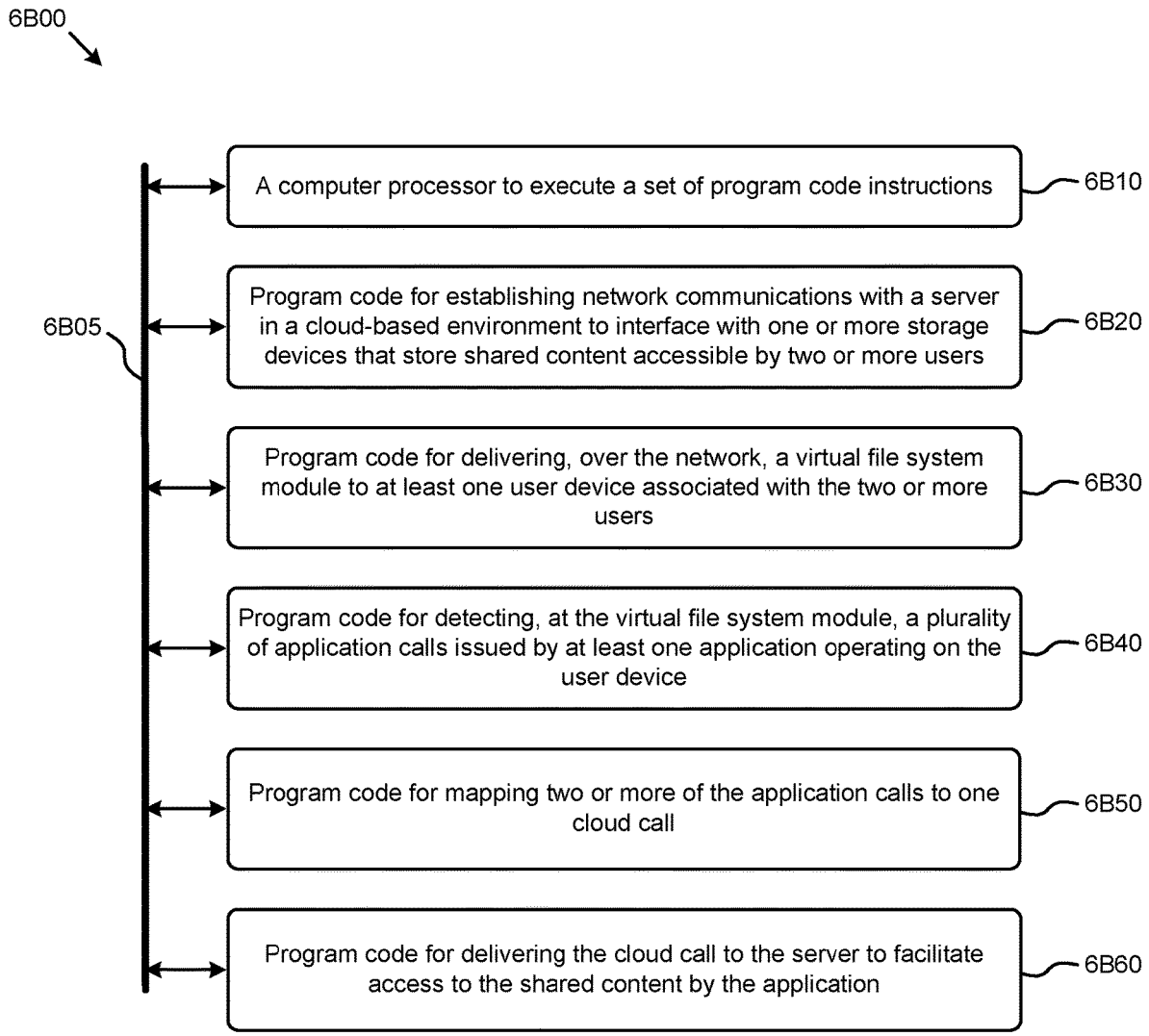

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment.

The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising a computer processor to execute a set of program code instructions (see module 6B10) and modules for accessing memory to hold program code instructions to perform: establishing network communications with a server in a cloud-based environment to interface with one or more storage devices that store shared content accessible by two or more users (see module 6B20); delivering, over the network, a virtual file system module to at least one user device associated with the two or more users (see module 6B30); detecting, at the virtual file system module, a plurality of application calls issued by at least one application operating on the user device (see module 6B40); mapping two or more of the application calls to one cloud call (see module 6B50); and delivering the cloud call to the server to facilitate access to the shared content by the application (see module 6B60).

Figure 6C:
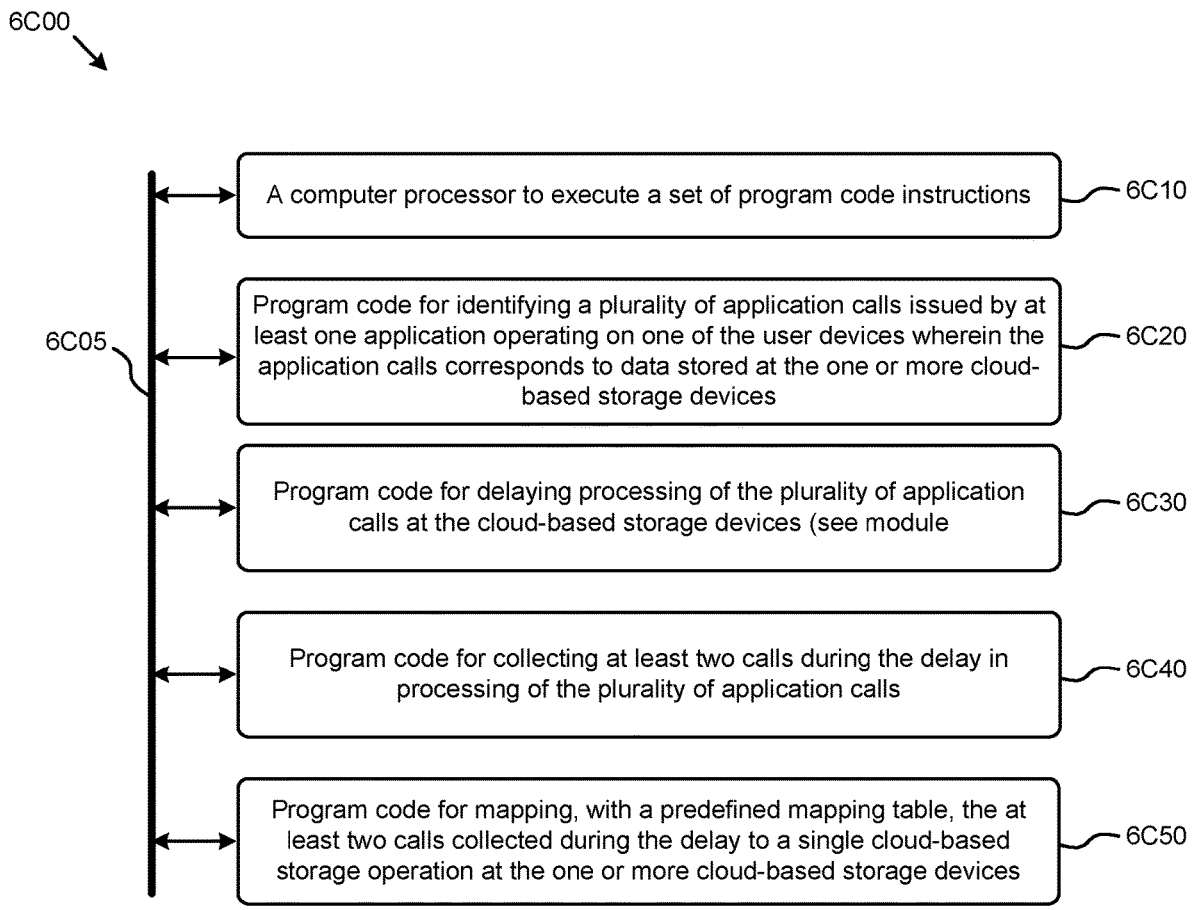

FIG. 6C depicts a system 6C00 as an arrangement of computing modules that are interconnected so as to operate cooperatively to implement certain of the herein-disclosed embodiments. The partitioning of system 6C00 is merely illustrative and other partitions are possible. As an option, the system 6C00 may be implemented in the context of the architecture and functionality of the embodiments described herein. Of course, however, the system 6C00 or any operation therein may be carried out in any desired environment.

The system 6C00 comprises at least one processor and at least one memory, the memory serving to store program instructions corresponding to the operations of the system. As shown, an operation can be implemented in whole or in part using program instructions accessible by a module. The modules are connected to a communication path 6C05, and any operation can communicate with other operations over communication path 6C05. The modules of the system can, individually or in combination, perform method operations within system 6C00. Any operations performed within system 6C00 may be performed in any order unless as may be specified in the claims. The shown embodiment implements a portion of a computer system, presented as system 6C00, comprising a computer processor to execute a set of program code instructions (see module 6C10) and modules for accessing memory to hold program code instructions to perform: identifying a plurality of application calls issued by at least one application operating on one of the user devices wherein the application calls corresponds to data stored at the one or more cloud-based storage devices (see module 6C20); delaying processing of the plurality of application calls at the cloud-based storage devices (see module 6C30); collecting at least two calls during the delay in processing of the plurality of application calls (see module 6C40); and mapping, with a predefined mapping table, the at least two calls collected during the delay to a single cloud-based storage operation at the one or more cloud-based storage devices (see module 6C50).

System Architecture Overview

Additional System Architecture Examples

Figure 7A:
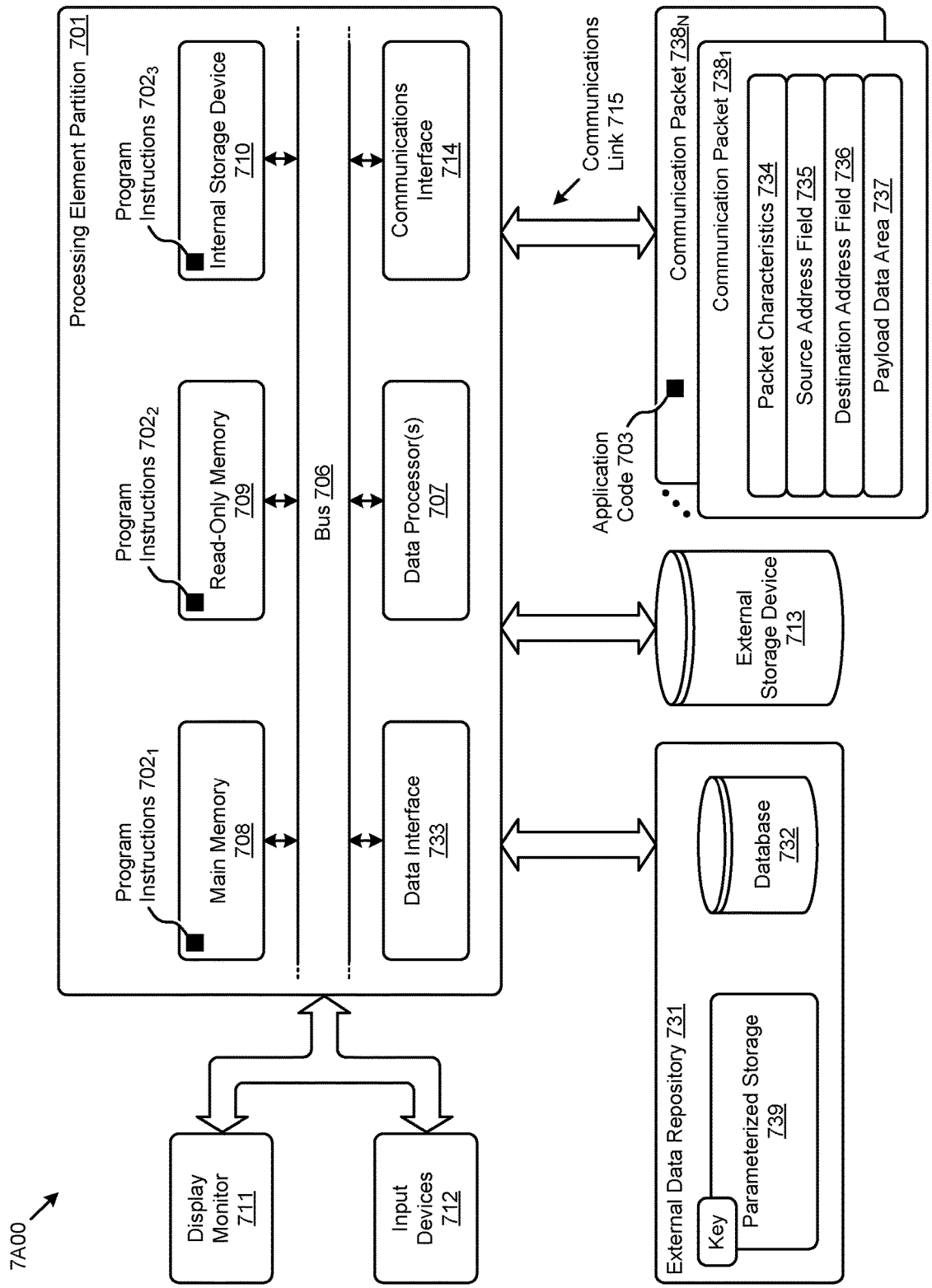
FIG. 7A and FIG. 7B present block diagrams of computer system architectures having components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

The communications link 715 can be configured to transmit (e.g., send, receive, signal, etc.) any types of communications packets (e.g., communications packet $738_1$, communications packet $738_N$) comprising any organization of data items. The data items can comprise a payload data area 737, a destination address 736 (e.g., a destination IP address), a source address 735 (e.g., a source IP address), and can include various encodings or formatting of bit fields to populate the shown packet characteristics 734. In some cases the packet characteristics include a version identifier, a packet or payload length, a traffic class, a flow label, etc. In some cases the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 7A00. According to certain embodiments of the disclosure, two or more instances of computer system 7A00 coupled by a communications link 715 (e.g., LAN, PTSN, or wireless network) may perform the sequence of instructions required to practice embodiments of the disclosure using two or more instances of components of computer system 7A00.

The computer system 7A00 may transmit and receive messages such as data and/or instructions organized into a data structure (e.g., communications packets). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). A module may include one or more state machines and/or combinational logic used to implement or facilitate the operational and/or performance characteristics of operation mapping in a virtual file system.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of operation mapping in a virtual file system for cloud-based shared content). Such files or records can be brought into and/or stored in volatile or non-volatile memory.

Figure 7B:
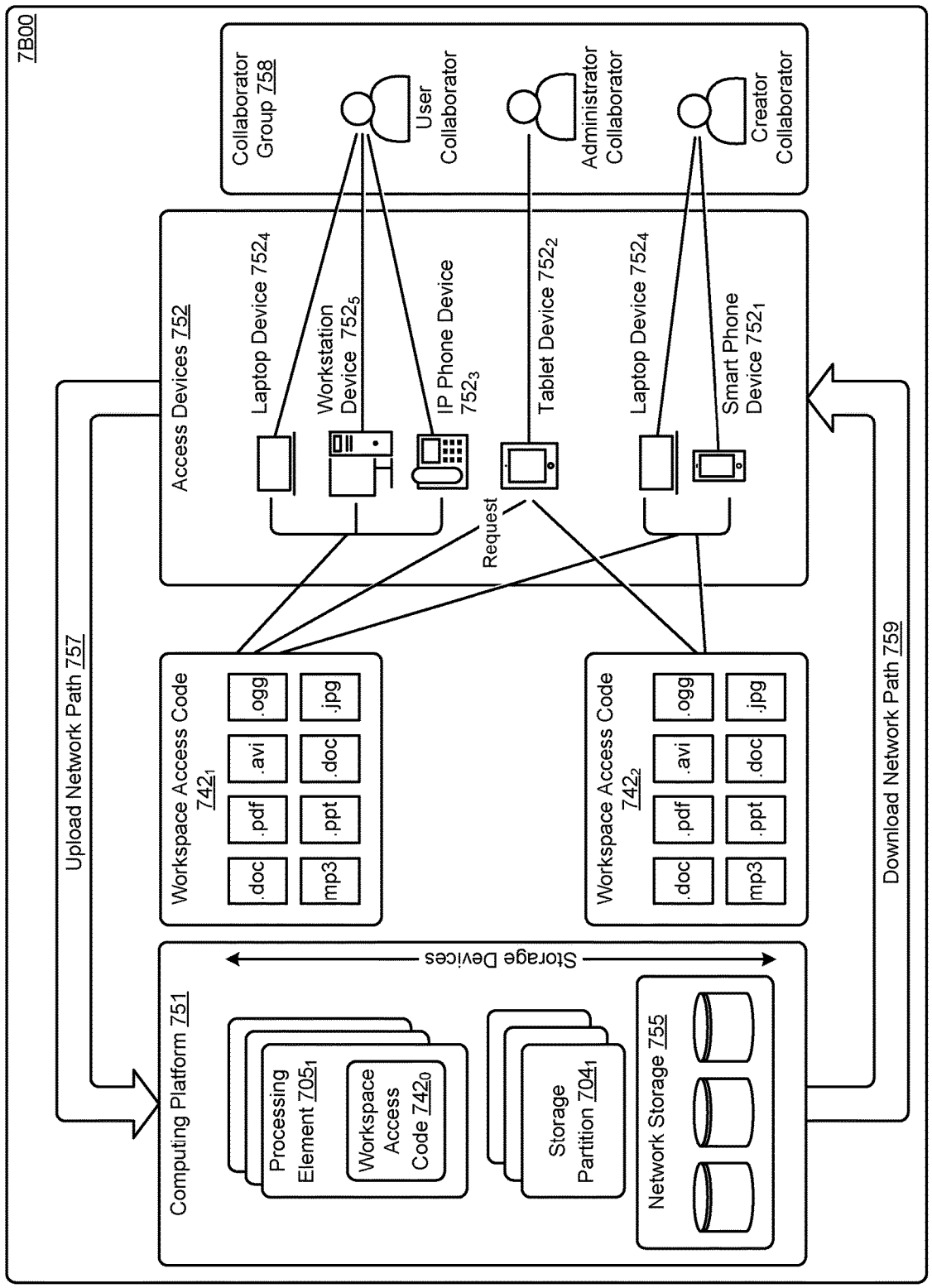

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$) Workspace access code can be executed on any of the shown access devices 752 (e.g., laptop device 752₄, workstation device 752₅, IP phone device 752₃, tablet device 752₂, smart phone device 752₁, etc.). A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 751, including in a middleware setting. As shown, a portion of the workspace access code resides in and can be executed on one or more processing elements (e.g., processing element 705₁). The workspace access code can interface with storage devices such the shown networked storage 755. Storage of workspaces and/or any constituent files or objects, and/or any other code or scripts or data can be stored in any one or more storage partitions (e.g., storage partition 704₁). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for managing error response handling in a platform-agnostic manner, the method comprising:
   implementing a virtual file system on a user device to facilitate access to shared content stored at a cloud-based storage system, wherein the virtual file system delivers one or more messages from the cloud-based storage system to an application on the user device;
   determining whether at least one message from the one or more messages comprises an error response;
   translating, at the virtual file system, the at least one message that comprises the error response from the cloud-based storage system to an application response corresponding to the application; and
   delivering the application response from the virtual file system to the application on the user device, wherein the application response comprises at least one error message corresponding to an application-specific or an operating system-specific instance of the application response that was translated.

2. The method of claim 1, wherein acts of translating the at least one message is based at least in part on one of, a syntax, a semantic, a type, a parameter, an exception, a return error code, or a code variation that is associated with the at least one message.

3. The method of claim 1, wherein translating the at least one message further comprises mapping an error code from a virtual file system code to an application-specific error code.

4. The method of claim 3, wherein mapping the error code from the virtual file system code to the application-specific error code is based at least in part on one or more pattern rules, the pattern rules characterizing an association between an application error handling method and a normalized cloud-based storage operation.

5. The method of claim 1, wherein the application response corresponds to an error handling protocol of the application.

6. The method of claim 1, wherein the one or more messages from the cloud-based storage system correspond to normalized cloud operation responses from application calls made by the user from the application to the cloud-based storage system, the normalized cloud operation responses comprising at least the error response.

7. The method of claim 1, wherein the virtual file system comprises a platform-specific interface to a base subsystem that maps platform-specific operations to normalized cloud operations.

8. A computer readable medium, embodied in a non-transitory computer readable medium, the non-transitory computer readable medium having stored thereon a sequence of instructions which, when stored in memory and executed by a processor causes the processor to perform a set of acts for managing error response handling in a platform-agnostic manner, the acts comprising:
   implementing a virtual file system on a user device to facilitate access to shared content stored at a cloud-based storage system, wherein the virtual file system delivers one or more messages from the cloud-based storage system to an application on the user device;
   determining whether at least one message from the one or more messages comprises an error response;
   translating, at the virtual file system, the at least one message that comprises the error response from the cloud-based storage system to an application response corresponding to the application; and
   delivering the application response from the virtual file system to the application on the user device, wherein the application response comprises at least one error message corresponding to an application-specific or an operating system-specific instance of the application response that was translated.

9. The computer readable medium of claim 8, wherein acts of translating the at least one message is based at least in part on one of, a syntax, a semantic, a type, a parameter, an exception, a return error code, or a code variation that is associated with the at least one message.

10. The computer readable medium of claim 8, wherein translating the at least one message further comprises mapping an error code from a virtual file system code to an application-specific error code.

11. The computer readable medium of claim 10, wherein mapping the error code from the virtual file system code to the application-specific error code is based at least in part on one or more pattern rules, the pattern rules characterizing an association between an application error handling method and a normalized cloud-based storage operation.

12. The computer readable medium of claim 8, wherein the application response corresponds to an error handling protocol of the application.

13. The computer readable medium of claim 8, wherein the one or more messages from the cloud-based storage system correspond to normalized cloud operation responses from application calls made by the user from the application to the cloud-based storage system, the normalized cloud operation responses comprising at least the error response.

14. The computer readable medium of claim 8, wherein the virtual file system comprises a platform-specific interface to a base subsystem that maps platform-specific operations to normalized cloud operations.

15. A system for managing error response handling in a platform-agnostic manner, the system comprising:
   a storage medium having stored thereon a sequence of instructions; and
   a processor or processors that execute the instructions to cause the processor or processors to perform a set of acts, the acts comprising,
      implementing a virtual file system on a user device to facilitate access to shared content stored at a cloud-based storage system, wherein the virtual file system delivers one or more messages from the cloud-based storage system to an application on the user device;
      determining whether at least one message from the one or more messages comprises an error response;
      translating, at the virtual file system, the at least one message that comprises the error response from the cloud-based storage system to an application response corresponding to the application; and
      delivering the application response from the virtual file system to the application on the user device, wherein the application response comprises at least one error message corresponding to an application-specific or an operating system-specific instance of the application response that was translated.

16. The system of claim 15, wherein acts of translating the at least one message is based at least in part on one of, a syntax, a semantic, a type, a parameter, an exception, a return error code, or a code variation that is associated with the at least one message.

17. The system of claim 15, wherein translating the at least one message further comprises mapping an error code from a virtual file system code to an application-specific error code.

18. The system of claim 17, wherein mapping the error code from the virtual file system code to the application-specific error code is based at least in part on one or more pattern rules, the pattern rules characterizing an association between an application error handling method and a normalized cloud-based storage operation.

19. The system of claim 15, wherein the application response corresponds to an error handling protocol of the application.

20. The system of claim 15, wherein the one or more messages from the cloud-based storage system correspond to normalized cloud operation responses from application calls made by the user from the application to the cloud-based storage system, the normalized cloud operation responses comprising at least the error response.

21. The system of claim 15, wherein the virtual file system comprises a platform-specific interface to a base subsystem that maps platform-specific operations to normalized cloud operations.

* * * * *